US008825725B2

(12) United States Patent
Watanabe et al.

(10) Patent No.: US 8,825,725 B2
(45) Date of Patent: Sep. 2, 2014

(54) MANAGEMENT SERVER, MANAGEMENT METHOD, AND MANAGEMENT PROGRAM FOR EXECUTION ON A MANAGEMENT SERVER

(75) Inventors: Kentaro Watanabe, Yokohama (JP); Mineyoshi Masuda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 121 days.

(21) Appl. No.: 13/390,949

(22) PCT Filed: Jun. 16, 2010

(86) PCT No.: PCT/JP2010/004004
§ 371 (c)(1),
(2), (4) Date: Apr. 26, 2012

(87) PCT Pub. No.: WO2011/074152
PCT Pub. Date: Jun. 23, 2011

(65) Prior Publication Data
US 2012/0221611 A1     Aug. 30, 2012

(30) Foreign Application Priority Data

Dec. 17, 2009  (JP) ................................. 2009-286268

(51) Int. Cl.
*G06F 17/30*    (2006.01)
(52) U.S. Cl.
USPC ........................................ 707/823; 707/827
(58) Field of Classification Search
USPC .................................. 707/827, 823; 711/173
See application file for complete search history.

(56) References Cited

U.S. PATENT DOCUMENTS

| 7,509,454 B2 | 3/2009 | Kano |
| 7,757,034 B1* | 7/2010 | Dobrovolskiy et al. ........... 711/6 |
| 2003/0051117 A1* | 3/2003 | Burch et al. ................... 711/173 |
| 2003/0191909 A1 | 10/2003 | Asano et al. |
| 2006/0277386 A1 | 12/2006 | Eguchi |

(Continued)

FOREIGN PATENT DOCUMENTS

| JP | 2003-303054 A | 10/2003 |
| JP | 2005-092308 A | 4/2006 |

(Continued)

OTHER PUBLICATIONS

Toshimitsu Tanaka, "Boot Camp o Sotsugyo suru Tameno Deep na Katsuyojutsu Kasoka Soft no Maniac Ura Settei", Mac People, Aug. 1, 2009, vol. 15, No. 8, pp. 129-135.

*Primary Examiner* — Cam Truong
(74) *Attorney, Agent, or Firm* — Volpe and Koenig, P.C.

(57) ABSTRACT

A file system corresponding to virtual hard disk files is identified, and a file size of the virtual hard disk files after optimization is calculated from the size of the volume in use of the file system so that a volume size can be ensured by the optimization is calculated. Specifically, a management server performs the above-described processing, and has the following structure. The management server is connected to a physical server that is virtually composed of virtual servers including virtual hard disks. The management server comprises a volume acquiring unit that acquires the volume in use of a first file system on the virtual hard disks; a file size acquiring unit that acquires the file size of virtual hard disk files corresponding to the first file system; and a calculating unit that calculates an optimized file size of the virtual hard disk files on the basis of a difference between the acquired volume in use and the file size.

14 Claims, 29 Drawing Sheets

(56) References Cited

U.S. PATENT DOCUMENTS

| | | |
|---|---|---|
| 2007/0226447 A1 | 9/2007 | Shimozono et al. |
| 2008/0104350 A1 | 5/2008 | Shimizu et al. |
| 2011/0066823 A1 | 3/2011 | Ando et al. |

FOREIGN PATENT DOCUMENTS

| | | |
|---|---|---|
| JP | 2006-338341 A | 12/2006 |
| JP | 2007-257317 A | 10/2007 |
| JP | 2008-112276 A | 5/2008 |

\* cited by examiner

| TIME | HOST NAME | FS | Total | Used | Free |
|---|---|---|---|---|---|
| 2009/7/30 10:00:00 | host1 | FS 0 | 50GB | 10GB | 40GB |
| 2009/7/30 10:00:00 | host2 | FS 1 | 50GB | 8GB | 42GB |
| 2009/7/30 10:00:00 | host3 | FS 2 | 60GB | 8GB | 52GB |
| 2009/7/30 10:00:00 | host4 | FS 3 | 60GB | 10GB | 50GB |

| TIME | VHD file | Size | Max |
|---|---|---|---|
| 2009/7/30 10:00:00 | VHD file 1 | 10GB | 50GB |
| 2009/7/30 10:00:00 | VHD file 2 | 20GB | 60GB |
| 2009/7/30 10:00:00 | VHD file 3 | 50GB | 60GB |

Columns: 601, 602, 603, 604

| VHD file | VM | HARD DISK I/F | TYPE | IN USE | SERVER | FS | Path |
|---|---|---|---|---|---|---|---|
| VHD file 1 | VM1 | IDE Controller 0 | Dynamic | True | p-Serv01 | FS 0 | C:¥VHD¥xxx1.vhd |
| VHD file 2 | VM2 | IDE Controller 0 | Dynamic | True | p-Serv01 | FS 0 | C:¥VHD¥xxx2.vhd |
| VHD file 3 | VM2 | SCSI Controller 0 | Dynamic | True | p-Serv01 | FS 0 | C:¥VHD¥xxx3.vhd |
| VHD file 4 | VM3 | IDE Controller 0 | Dynamic | True | p-Serv01 | FS 0 | C:¥VHD¥xxx4.vhd |
| VHD file 5 | VM3 | SCSI Controller 0 | Dynamic | True | p-Serv01 | FS 0 | C:¥VHD¥xxx5.vhd |
| VHD file 6 | VM3 | SCSI Controller 1 | Fix | True | p-Serv01 | FS 0 | C:¥VHD¥xxx6.vhd |
| VHD file 7 | VM4 | IDE Controller 0 | Dynamic | False | p-Serv01 | FS 0 | C:¥VHD¥xxx7.vhd |
| VHD file 8 | n/a | n/a | Dynamic | False | p-Serv01 | FS 0 | C:¥VHD¥xxx8.vhd |

Columns: 701, 702, 703, 704, 705, 706, 707, 708

| FS | HOST NAME | HARD DISK I/F | DISK DRIVE |
|---|---|---|---|
| FS 1 | host 1 | IDE Controller 0 | Disk 0 |
| FS 2 | host 1 | IDE Controller 0 | Disk 0 |
| FS 3 | host 2 | IDE Controller 0 | Disk 0 |
| FS 4 | host 2 | SCSI Controller 0 | Disk 0 |
| FS 5 | host 3 | IDE Controller 0 | Disk 0 |
| FS 6 | host 3 | SCSI Controller 0 | Disk 0 |
| FS 7 | host 3 | SCSI Controller 1 | Disk 0 |
| FS 8 | n/a | n/a | n/a |
| FS 9 | n/a | n/a | n/a |

| VHD file | FS |
|---|---|
| VHD file 1 | FS 1 |
| VHD file 1 | FS 2 |
| VHD file 2 | FS 3 |
| VHD file 3 | FS 4 |
| VHD file 4 | FS 5 |
| VHD file 5 | FS 6 |
| VHD file 6 | FS 7 |
| VHD file 7 | FS 8 |
| VHD file 8 | FS 9 |

| VM | HOST NAME |
|---|---|
| VM 1 | host 1 |
| VM 2 | host 2 |
| VM 3 | host 3 |
| VM 4 | host 4 |

1001 = VM column, 1002 = HOST NAME column

| TARGET | CONDITION | ACTION | THRESHOLD VALUE ID |
|---|---|---|---|
| HOST FILE SYSTEM | FREE SIZE / TOTAL SIZE < 80% | EVENT OCCURRED (FREE VOLUME OF FILE SYSTEM OF HOST IS INSUFFICIENT). | THRESHOLD VALUE 1 |
| PHYSICAL SERVER | CPU USAGE RATE > 80% \|\| MEMORY USAGE RATE > 80% \|\| DISK USAGE RATE > 80% | EVENT OCCURRED (LOAD OF HOST HAS EXCEEDED CRITICAL REGION). | THRESHOLD VALUE 2 |

1102 = TARGET, 1103 = CONDITION, 1104 = ACTION, 1101 = THRESHOLD VALUE ID

| INCIDENT ID | TIME OF OCCURRENCE | HANDLING DEADLINE TIME | CONTENT OF INCIDENT | STATUS | EVENT ID |
|---|---|---|---|---|---|
| INCIDENT 1 | 2009/5/10 10:00:00 | 2009/5/11 10:00:00 | FREE VOLUME OF FILE SYSTEM 0 OF HOST 0 IS INSUFFICIENT. | HANDLING COMPLETED | EVENT 0 |
| INCIDENT 2 | 2009/5/11 10:00:00 | 2009/5/12 10:00:00 | FREE VOLUME OF FILE SYSTEM 0 OF HOST 0 IS INSUFFICIENT. | HANDLING COMPLETED | EVENT 1 |
| INCIDENT 3 | 2009/5/12 10:00:00 | 2009/5/13 10:00:00 | FREE VOLUME OF FILE SYSTEM 0 OF HOST 0 IS INSUFFICIENT. | HANDLING COMPLETED | EVENT 2 |
| INCIDENT 4 | 2009/5/13 10:00:00 | 2009/5/14 10:00:00 | FREE VOLUME OF FILE SYSTEM 0 OF HOST 0 IS INSUFFICIENT. | HANDLING COMPLETED | EVENT 3 |
| INCIDENT 5 | 2009/5/14 10:00:00 | 2009/5/15 10:00:00 | FREE VOLUME OF FILE SYSTEM 0 OF HOST 0 IS INSUFFICIENT. | HANDLING BEING EXECUTED | EVENT 4 |

| HANDLING MEASURE ID 1301 | VIRTUAL HARD DISK 1302 | OPTIMIZATION START TIME 1303 | PHYSICAL SERVER 1304 | WEIGHT 1305 | EXECUTABILITY 1306 |
|---|---|---|---|---|---|
| HANDLING MEASURE 1 | VIRTUAL HARD DISK 1 | 2009/5/10 10:00:00 | p-Server01 | 100 | True |
| | VIRTUAL HARD DISK 2 | 2009/5/10 10:00:00 | p-Server01 | | |
| | VIRTUAL HARD DISK 3 | 2009/5/10 10:00:00 | p-Server01 | | |
| HANDLING MEASURE 1 | VIRTUAL HARD DISK 1 | 2009/5/10 10:00:00 | p-Server01 | 90 | True |
| | VIRTUAL HARD DISK 2 | 2009/5/10 10:00:00 | p-Server01 | | |
| | VIRTUAL HARD DISK 4 | 2009/5/10 12:00:00 | p-Server03 | | |
| HANDLING MEASURE 1 | VIRTUAL HARD DISK 5 | 2009/5/10 11:00:00 | p-Server02 | 80 | True |
| | VIRTUAL HARD DISK 6 | 2009/5/10 11:00:00 | p-Server03 | | |
| HANDLING MEASURE 1 | VIRTUAL HARD DISK 5 | n/a | n/a | n/a | True |
| | VIRTUAL HARD DISK 7 | n/a | n/a | | |

| SCHEDULE | START TIME | ESTIMATED END TIME | SERVER | COMMAND |
|---|---|---|---|---|
| #1 | 2009/5/10 10:00:00 | 2009/5/10 10:05:00 | p-serv01 | VMOptimize C:¥vhd¥file01.vhd |
| #2 | 2009/5/10 10:00:00 | 2009/5/10 10:05:00 | p-serv01 | VMOptimize C:¥vhd¥file02.vhd |
| #3 | 2009/5/10 10:00:00 | 2009/5/10 10:05:00 | p-serv01 | VMOptimize C:¥vhd¥file03.vhd |
| #4 | 2009/5/10 10:00:00 | 2009/5/10 10:03:00 | vm7 | VMLaunch |

| RESULT ID | SCHEDULE | START TIME | END TIME | RESULT |
|---|---|---|---|---|
| #1 | #1 | 2009/5/10 10:00:00 | 2009/5/10 10:05:00 | Success |
| #2 | #2 | 2009/5/10 10:00:00 | 2009/5/10 10:04:59 | Success |
| #3 | #3 | 2009/5/10 10:00:00 | 2009/5/10 10:04:58 | Success |

1501  1502  1503  1504  1505

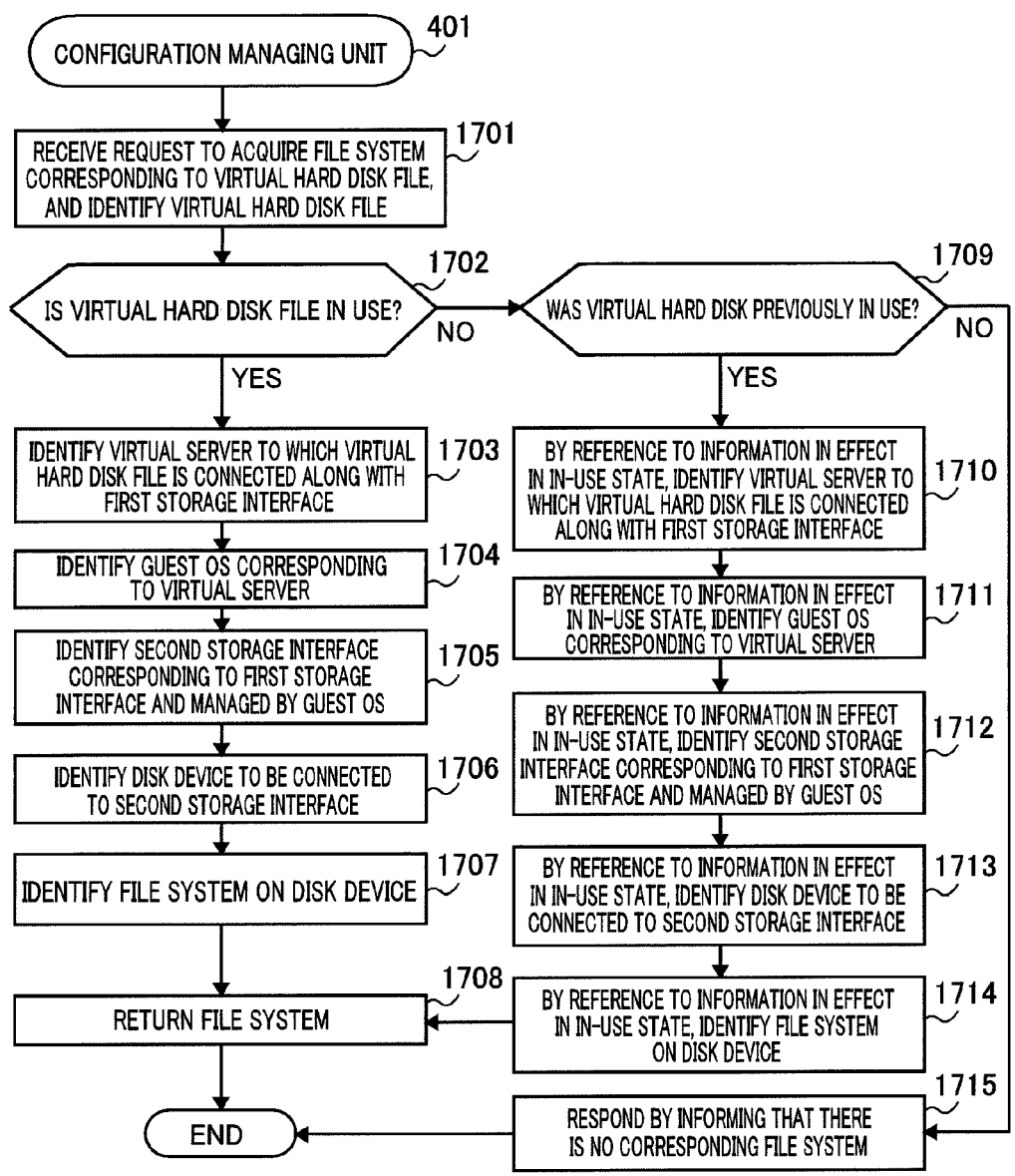

| EVENT ID | THRESHOLD VALUE ID | OBJECT | TIME |
|---|---|---|---|
| EVENT 1 | THRESHOLD VALUE 1 | HOST 0 | 2009/5/10 10:05:00 |
| EVENT 2 | THRESHOLD VALUE 2 | FILE SYSTEM 0 | 2009/5/10 10:05:00 |

420

| 3001 | 3002 |
|---|---|
| COPY-SOURCE VIRTUAL HARD DISK FILE | COPY-DESTINATION VIRTUAL HARD DISK FILE |
| VHD file 1 | VHD file 2 |
| VHD file 1 | VHD file 2 |
| VHD file 1 | VHD file 2 |

MANAGEMENT SERVER, MANAGEMENT METHOD, AND MANAGEMENT PROGRAM FOR EXECUTION ON A MANAGEMENT SERVER

TECHNICAL FIELD

This invention relates to a management server, a management method, and a management program for a virtual hard disk to be used by a virtual server.

BACKGROUND ART

Corporate information processing systems and data centers have come to possess growing numbers of servers, incurring the concomitant increase in the cost of server operation and management.

In order to solve this problem, there exist known techniques for virtualizing servers. The server virtualization techniques involve getting a single physical server to operate a plurality of virtual servers. Specifically, the processor (CPU), memory, and other resources of the physical server are divided, and the divided resources of the physical server are assigned to a plurality of virtual servers. And the multiple servers operate concurrently on one physical server. The virtualized servers possess virtual hardware resources, and are each assigned an amount of the divided physical server resources. In this manner, virtualized servers are operated collectively on the physical server, whereby the increase in the number of servers is minimized. In order to reduce costs, it is necessary to boost the degree of server aggregation.

A virtual hard disk is for use by a virtual server, and some virtual hard disks are handled as files on the physical server (on a virtualizing program) for enhanced operability. The virtual hard disk files include virtual hard disks of a fixed type which have the same disk size as the virtual hard disks when created, and virtual hard disks of a variable type which have their file size varied depending on the volume use size on the virtual hard disks. In the case of the variable type, the volume is not appropriated only once by the disk size, so that the degree of aggregation can be enhanced.

There exist similar storage virtualization techniques for assigning to the server a volume larger than the actual physical volume. The storage virtualization techniques also involve reducing costs by boosting the degree of aggregation in a manner similar to virtual hard disk files of the virtual type. As described In Patent Literature 1 below, it is possible to virtualize the storage volume so as to assign to the server a storage volume larger than the actual storage volume.

CITATION LIST

Patent Literature

[PTL 1]
Japanese Published Unexamined Patent Application No. 2007-257317

SUMMARY OF INVENTION

Technical Problem

However, there exists a trade-off relationship between performance and the degree of aggregation. Where resources exceeding physical resources are virtually assigned, if the degree of aggregation is too high, it may not be possible to deal with an abrupt increase in volume; if extra margins are set aside to address such abrupt increases in volume, the degree of aggregation may not be boosted. Thus, how to manage the volumes of virtual hard disks is important.

When the volumes on virtual hard disks of the variable type are being used, the sizes of virtual hard disk files are enlarged. On the other hand, when the volume use is reduced by deleting files, for example, the virtual hard disk files of the variable type are not reduced in size. To reduce the file sizes involves executing a process of optimizing virtual hard disk files on the physical server.

If the volumes of the physical server are exhausted, all virtual servers making use of the virtual hard disks of the variable type on the volumes are stopped. In order to avoid such a contingency while efficiently managing the capacity of the physical server volumes, it is necessary to take measures such as carrying out periodical maintenance, presenting the administrator with an indication of the degree of risk at which the virtual servers will come to a stop, giving an advance notice of virtual server stoppage, averting the situation of server stoppage in advance, and securing the time to perform failure recovery. Also, upon periodical maintenance of the system or upon detection of a shortage of volumes on the physical server, it is necessary for the administrator to take such measures as rearranging or optimizing virtual hard disk files so as to secure storage space. However, the existing techniques fail to provide indicators by which to determine the virtual hard disk file to be optimized out of a plurality of virtual hard disk files. The administrator has had trouble deciding on which virtual disk file to deal with, and had no clue as to what effects will result from handling the selected disk file. Thus there has been the need for offering indicators indicative of the measures to be taken in such cases and of how effective such measures will be.

An objective of this invention is to present the above-mentioned information so as to facilitate the maintenance of virtual hard disk files.

Solution to Problem

A file system corresponding to virtual hard disk files is identified, and a file size of the virtual hard disk files after optimization is calculated from the size of the volume in use of the file system so that a volume size that can be ensured by the optimization is calculated.

Specifically, a management server performs the above-described processing, and has the following structure. The management server is connected to a physical server that is virtually composed of virtual servers including virtual hard disks. The management server comprises: a volume acquiring unit that acquires the volume in use of a first file system on the virtual hard disks; a file size acquiring unit that acquires the file size of virtual hard disk files corresponding to the first file system; and a calculating unit that calculates an optimized file size of the virtual hard disk files on the basis of a difference between the acquired volume in use and the file size.

As an alternative, the management server may include an optimization determining unit that determines whether or not to optimize the virtual hard disks based on the optimized size.

As a further alternative, the optimization determining unit of the management server may determine whether or not to optimize the virtual hard disk files in accordance with a future use volume estimated from a past tendency of the volumes in use of the first file system, and with the file size based on the optimized size.

As an even further alternative, the virtual hard disk files may be included in a second file system managed by a management OS on the physical server. The calculating unit of the management server may calculate the optimized file size on the basis of the difference between a file size that combines the file size of the virtual hard disk files with the file size of other virtual hard disk files on the one hand, and a used volume that combines the volume in use of the first file system corresponding to the virtual hard disk files with the volume in use of other file systems corresponding to other virtual hard disk files on the other hand.

Advantageous Effects of Invention

According to this invention, it is possible to support easy management of virtual hard disk files by the administrator.

BRIEF DESCRIPTION OF DRAWINGS

FIG. 6 is a view showing an example of a virtual hard disk file size table.

FIG. 7 is a view showing an example of a virtual hard disk configuration table.

FIG. 8 is a view showing an example of a file system configuration table.

FIG. 9 is a view showing an example of a virtual hard disk file system correspondence table.

FIG. 10 is a view showing an example of a virtual server OS correspondence table.

FIG. 11 is a view showing an example of a threshold value table.

FIG. 12 is a view showing an example of an incident table.

FIG. 13 is a view showing an example of a handling measure table.

FIG. 14 is a view showing an example of a schedule table.

FIG. 15 is a view showing an example of a schedule execution result table.

FIG. 17 is a flowchart showing processing operations performed by a configuration managing unit for identifying a file system from virtual hard disk files.

DESCRIPTION OF EMBODIMENTS

Some examples of executing this invention are explained below.

Example 1

The management server to be described below is disclosed as Example 1. The management server is connected to a physical server that virtually comprises virtual servers including virtual hard disks. The management server acquires the used volume of a file system on a virtual hard disk for use by a virtual server, and acquires the file size of the virtual hard disk file corresponding to the file system. An optimized file size of the virtual hard disk file is calculated on the basis of the difference between the used volume acquired and the file size. Based on the optimized size, it is determined whether or not to optimize the virtual hard disk.

In determination of whether or not to optimize the virtual hard disk, a future use volume estimated from the past tendency of the used volume of the file system is used. Also, the optimized file size is calculated from the difference between the sum of the used volumes of all file systems on the virtual hard disks on the one hand, and the file size of the virtual hard disk files corresponding to a plurality of file systems on the other hand.

Figure 1:
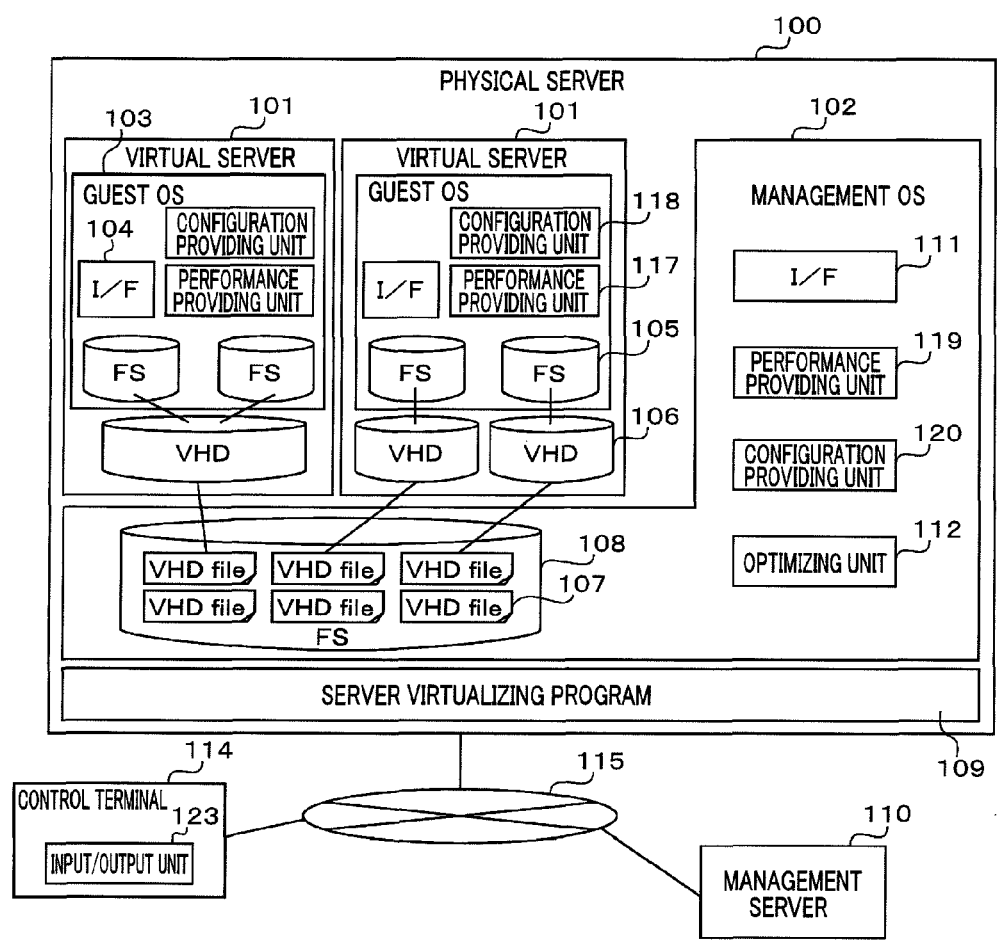
FIG. 1 is a configuration diagram of an information processing system as an example.

FIG. 1 is a configuration diagram of an information processing system as this example including a management server. The information processing system comprises a physical server 100, a management server 110, and a control terminal 114. The physical server 100, management server 110, and control terminal 114 are interconnected via a network 115.

The physical server 100 is a computer targeted to be managed by the management server 110. The physical server 100 contains a server virtualizing program 109, a plurality of virtual servers 101, and a management OS 102.

The server virtualizing program 109 is a program that virtually implements the virtual servers 101, to be discussed later, on the physical server 100. A program called hypervisor belongs to the virtualizing program 101. The virtual servers 101 form a virtual computer environment implemented on the physical server 100. Servers called Virtual Machine and LPAR belong to the virtual servers 101. Incidentally, the virtual servers 101 are not limited to specific purposes as long as they make up the virtual computer environment; they can be used either as servers or as clients. In particular, if the virtual servers are used as clients, the OS is frequently shut down, so that the virtual hard disks can be optimized during the shutdown.

The virtual servers 101 are each furnished with a guest OS 103. The guest OS 103 is either a common OS or an OS specialized for server virtualization, and operates on the virtual server 101. For example, Windows (registered trademark) or Linux (registered trademark) may operate on the virtual server 101. The guest OS 103 includes file systems (FS) 105, virtual hard disks (VHD) 106, an interface (I/F) 104, a performance providing unit 117, and a configuration providing unit 118.

The file systems 105 are common OS file systems that are constructed on the virtual hard disks 106, to be discussed later.

The virtual hard disks 106 are virtual disk devices implemented by the server virtualizing program 109. The virtual hard disks 106 are recognized as disk devices by the guest OS 103. On the other hand, if configured using virtual hard disk files, the virtual hard disks 106 are recognized as the virtual hard disk files 107 by the management OS 102. Other than the virtual hard disk files 107, the logical volumes on a hard disk 311 (FIG. 3) owned by the physical server may be used directly as the virtual hard disks 106 for the virtual server 101 according to some techniques, and an LU (Logical Unit) of a storage apparatus 122 (FIG. 2) may be used as a virtual hard disk according to other techniques.

The interface 104 is an interface through which the information managed by the guest OS 103 is acquired or configured. By way of the guest OS 103, it is possible to acquire or configure information from the performance providing unit 117 or configuration providing unit 118, to be discussed later. Also, it is possible to request processing from the guest OS or to receive the returned result of the processing therefrom.

The performance providing unit 117 is a processing unit that provides the performance information managed by the guest OS 103. The performance information under management of the guest OS 103 is performance information which is provided by a common OS and which may include CPU usage rate, memory usage rate, and the total volume size, used size, and free size of file systems, for example.

The configuration providing unit 118 is a processing unit that provides the configuration information managed by the guest OS. The configuration information under management of the guest OS 103 is configuration information which is provided by a common OS and which may denote the hardware configuration and software configuration of the virtual server 101, information about other components, and information about the relations between the components, for example. Specifically, the information about the file systems 105 in a file system configuration table 407, to be discussed later, corresponds to the configuration information.

The management OS 102 is an OS that manages the virtual servers 101 in collaboration with the server virtualizing program 109. "Service Console" under VMware (registered trademark), "Root Partition" under Hyper-V (registered trademark), "Domain-O" under Xen (registered trademark), and "Shadow LPAR" under Virtage (registered trademark) correspond to the management OS 102.

The management OS 102 comprises an interface 111, an optimizing unit 112, a performance providing unit 119, and a configuration providing unit 120.

The interface 111 is an interface through which the information of the management OS is acquired or configured or via which a processing request is sent to the management OS or a response is received therefrom. Information is acquired or configured from the performance providing unit 119 and configuration providing unit 120, to be discussed later, by way of the interface 111. Also, requests are made to the optimization processing unit, to be discussed later, and responses are received therefrom through the interface 111. Furthermore, it is possible to acquire through the interface 111 the information managed by the configuration providing unit 118 or performance providing unit 117 operating on the guest OS in collaboration with programs other than the guest OS or with the interface 104.

The optimizing unit 112 is a processing unit that executes optimization processing of the virtual hard disks 107, to be discussed later. The optimization processing is a process that reduces the file size of the virtual hard disk files 107 of the variable type by releasing unused areas. Upon receipt of an optimization processing request, the optimizing unit 112 performs optimization processing of the requested virtual hard disk. Upon completion of the optimization processing, the optimizing unit 112 returns the result of the processing.

The performance providing unit 119 is a processing unit that provides the performance information managed by the management OS 102. What is provided is the performance information about the physical server 101 and the performance information provided by the server virtualizing program 109. The performance information in this context refers to an amount of the calculation resources of the physical server 101 (the clock frequency of a CPU 301, the capacity of a main memory 303, the bandwidth of an HDD interface 306, and the bandwidth of a LAN interface) assigned to the virtual servers 101. The performance information also includes the total volume size, used volume size, and free volume size of a file system 108, to be discussed later. The performance information further includes the file size and a maximum extended file size of the virtual hard disk files 107, to be discussed later, managed on the file system 108 or on a file system 113, and information as to whether or not a virtual hard disk is being used.

The configuration providing unit 120 is a processing unit that provides the configuration information managed by the management OS 102. What is provided is component information such as hardware configuration information and software configuration information about the physical server 101, and information about the relations between the components. Also provided is component information such as virtual hardware configuration information and software configuration information provided by the server virtualizing program 109 to the virtual servers 101 and management OS 111 as well as information about the relations between the components.

The information provided by the configuration providing unit 120 may correspond, for example, to the information shown in a virtual hard disk configuration table 412, to be discussed later, and information about the file systems 108 and 113 in the file system configuration table 407, to be discussed later.

The management OS 102 contains the file system 108. The file system 108 for managing files may be either an ordinary file system or a file system of which the design is specialized for server virtualization. The file system 108 includes a plurality of virtual hard disk files 107.

The virtual hard disk files 107 are managed as files by the virtual hard disks and by the file system 108. On the other hand, when mounted and started on a virtual server 101, a virtual hard disk file 107 may be used as a hard disk (virtual hard disk 106) by the virtual server 109.

The virtual hard disks 107 are categorized into a fixed type and a variable type. The virtual hard disk files 107 of the fixed type, when created, take on the file size equivalent to the total disk volume size of the virtual hard disk 106 regardless of the used volume. On the other hand, the virtual hard disk files 107 of the variable type are created as files of which the size is equivalent to the volume used upon creation; they do not secure the file size equivalent to the total disk volume size of the virtual hard disk 106. As the use of the disk volume on the virtual hard disk 106 increases, the file size of the virtual hard disk files 107 is expanded correspondingly. At this time, even where the used volume size of the virtual hard disk 106 is reduced, the virtual hard disk files 107 do not decrease if left unprocessed. In order to reduce the virtual hard disk files 107 in keeping with the actual used volume size, it is necessary to perform a process called optimization processing for defragmenting the virtual hard disk files 107.

Figure 2:
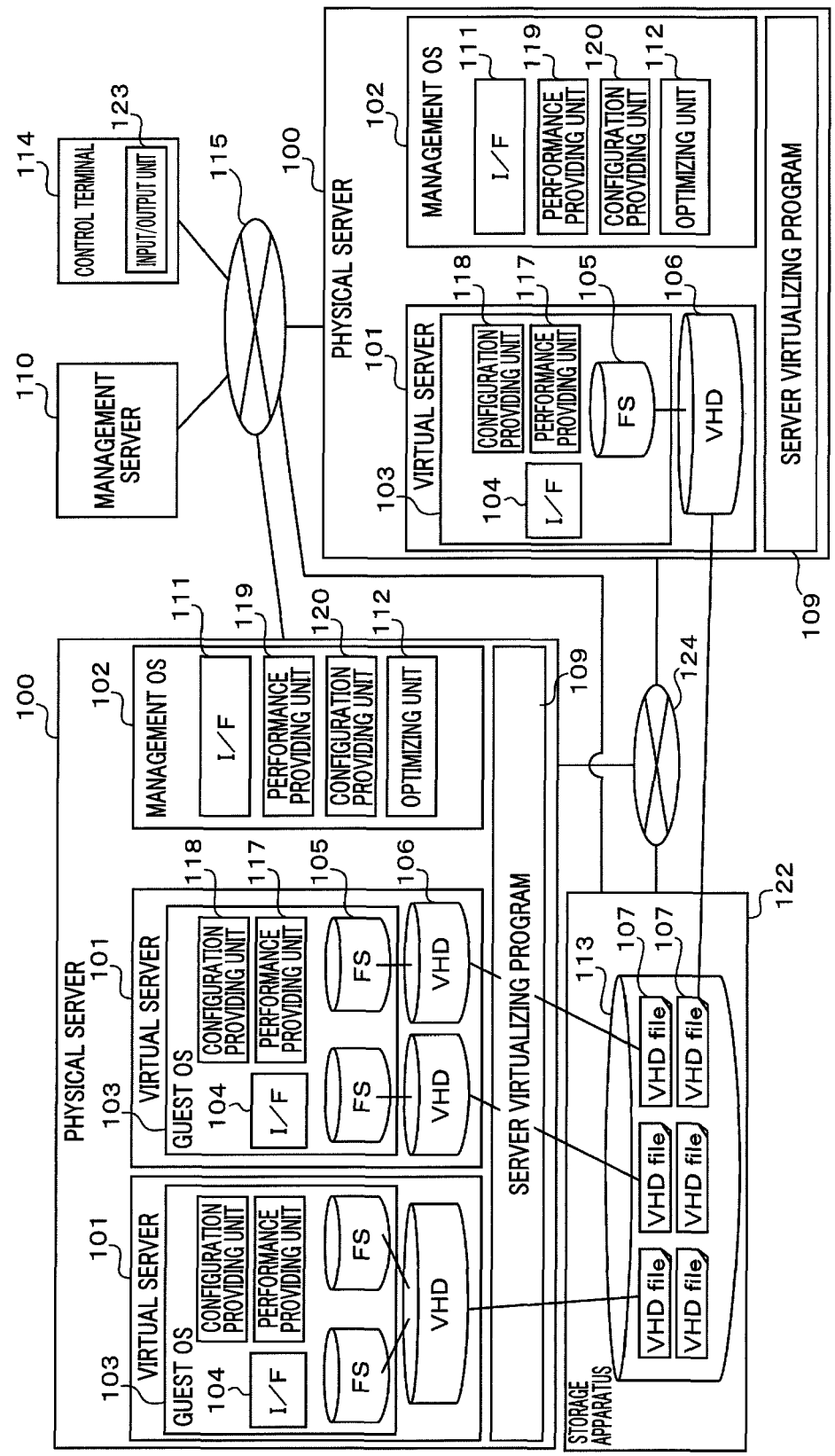
FIG. 2 is another configuration diagram of the information processing system as the example.

FIG. 2 is another configuration diagram of the information processing system as this example. The differences between this configuration and the configuration in FIG. 1 are as follows: This information processing system is configured so that the file system 113 including the virtual hard disk files 107 is incorporated in the storage apparatus 122 accessible from any one of a plurality of physical servers 100 via a network 124 so that the file system 113 may be used by the multiple physical servers 100 as a shared file system. The network 124 may be an SAN, an IP network, or CEE (Converged Enhanced Ethernet (registered trademark)).

Figure 3:
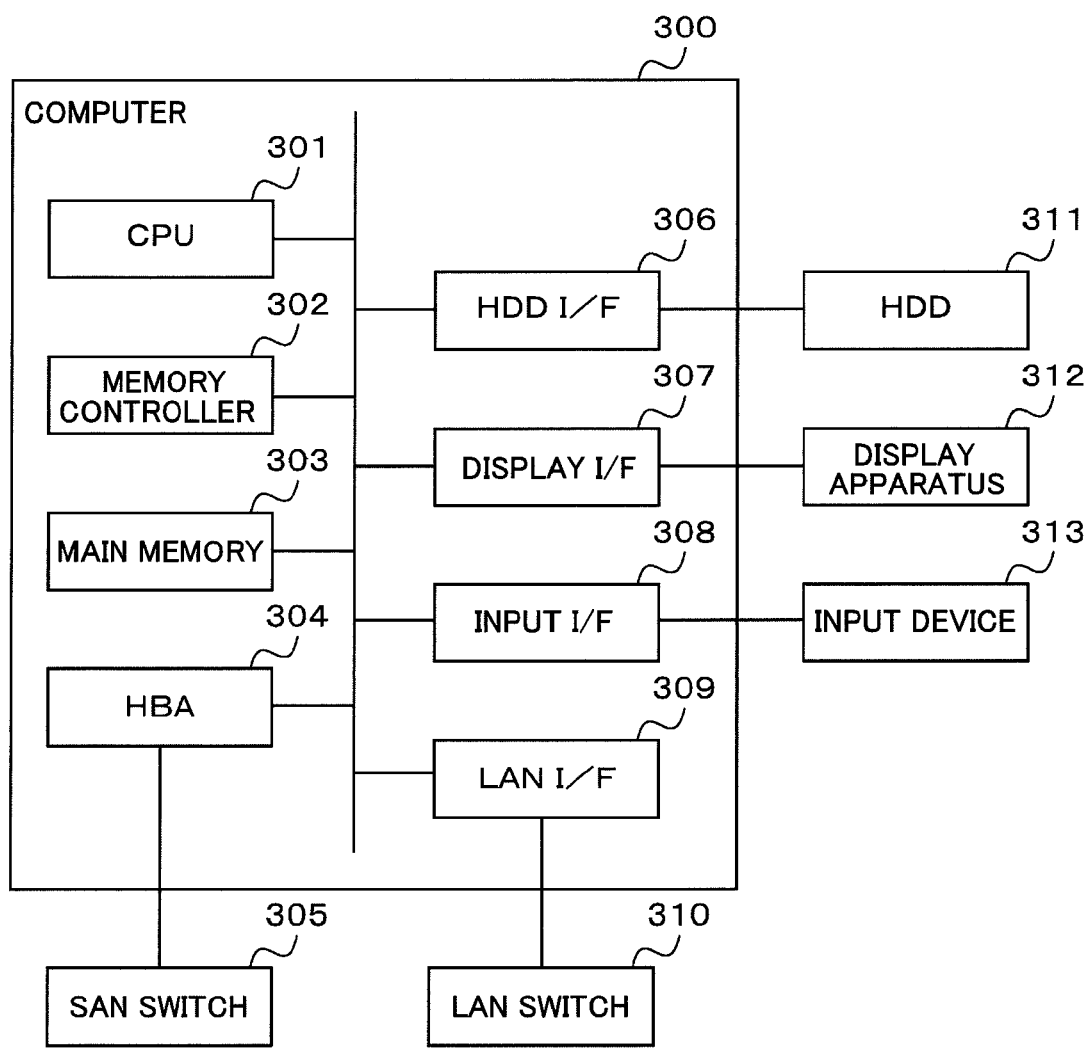
FIG. 3 is a view showing a hardware configuration of a computer.

The physical server 100 and management server 110 are common computers. FIG. 3 shows a hardware configuration of such a computer 300. The computer 300 is configured to have a CPU 301, a memory controller 302, a main memory 303, a host bus adapter (HBA) 304, a hard disk drive interface (HDD I/F) 306, a display interface 307, an input interface 308, and a LAN (Local Area Network) interface 309 interconnected via a bus 314. The HBA 304 is connected to the storage apparatus 122, for example, via an SAN (Storage Area Network) switch 305 and the network 124. The LAN I/F 309 is connected to the network 115 either directly or via a LAN switch 310. The HDD I/F 306 is connected to the HDD (Hardware Disc Drive) 311. Because the file system 108 is configured on the HDD 311 in the physical server 100 of FIG. 1, the physical server 100 gains access to the file system 108 via the HDD I/F 306 in hardware terms. The display interface 307 is connected to a display apparatus 312 as an output apparatus. The input interface 308 is connected to various input devices 313.

The management server 110 is a computer that operates and manages the physical server 100, virtual servers 101, storage apparatuses (not shown) connected to these servers, and the information processing system made up of the physical server 100 and virtual servers 101.

Figures 4, 5:
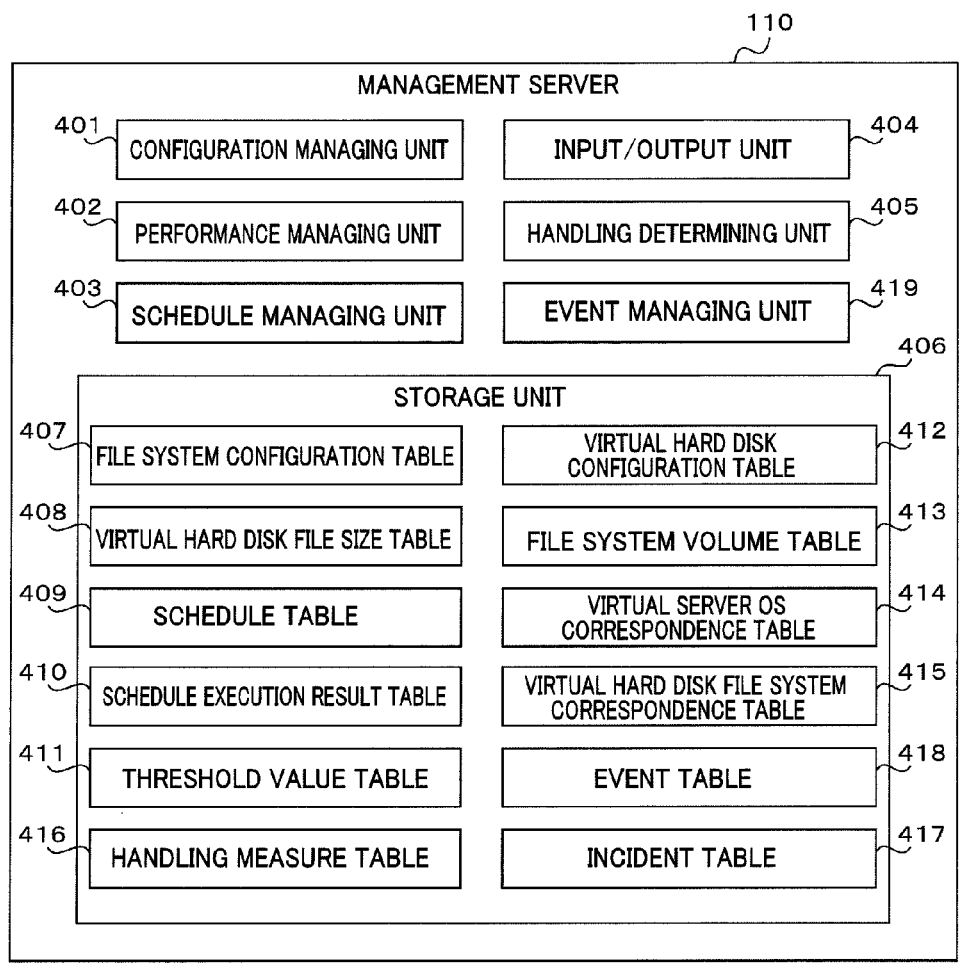
FIG. 4 is a view showing a detailed configuration of a management server.
FIG. 5 is a view showing an example of a file system volume table.

FIG. 4 is a view showing a detailed configuration of the management server 110. The management server 110 comprises a configuration managing unit 401, a performance managing unit 402, a schedule managing unit 403, an input/output unit 404, a handling determining unit 405, an event managing unit 419, and a storage unit 406. The configuration managing unit 401, performance managing unit 402, schedule managing unit 403, input/output unit 404, handling determining unit 405, and event managing unit 419 shown in FIG. 4 may be implemented by the CPU 301 reading programs onto the main memory 303. The storage unit 406 may be implemented using the hard disk 311, for example.

With this example, the configuration managing unit 401, performance managing unit 402, schedule managing unit 403, input/output unit 404, handling determining unit 405, event managing unit 419, and storage unit 406 are presented as configured units on the management server. However, this configuration is not limitative of this example. Alternatively, these units may be configured on the management OS 102, server virtualizing program 109, physical server 100, or storage apparatus 122.

Also, it is possible to implement partially or entirely these configured units as hardware of the management server, physical server 100, or storage apparatus 122; or as firmware, software, or programs operating on the management server, physical server 100, or storage apparatus 122. Furthermore, these configured units may be implemented partially or entirely as programs operating on the management OS 102 or on the server virtualizing program 109. If implemented as programs, the configured units may be stored on a storage medium. The storage medium containing the programs may then be offered and connected to the management server, physical server 100, or storage apparatus 122 for program installation and execution. Alternatively, these programs may be installed and executed as programs operating on the management OS 102 or on the server virtualizing program 109. As another alternative, the storage medium may be connected to separate hardware for installation to, and execution by, a desired server or storage apparatus.

The configuration managing unit 401 is a processing unit that manages the configuration information targeted to be managed by the management server 110. The configuration information includes so-called hardware configuration, software configuration, and system configuration. The configuration managing unit 401 manages the file system configuration table 407 and virtual hard disk configuration table 412, to be discussed later.

The performance managing unit 402 is a processing unit that manages the performance information targeted to be managed by the management server 110. The performance information includes operation information and performance indexes. The performance managing unit 402 manages a virtual hard disk file size table 408 and a file system volume table 413, to be discussed later.

The schedule managing unit 403 is a processing unit that manages the execution schedules of the processes targeted to be executed under management of the management server 110, as well as the results of executing the processes according to schedule. The execution schedules are managed by a schedule table 409, to be discussed later, and the execution results are managed by a schedule execution result table 410, to be discussed later.

The input/output unit 404 is a processing unit that controls the input and output to and from the management server 110.

The handling determining unit 405 determines handling measures for recovery from a failure of a target managed by the management server 110, and handling measures for removing the cause of the failure predicted to occur in the future in the managed target. Also, the handling determining unit 405 provides the administrator (at the control terminal 114) connected to the management server 110 to administer targets under management with information necessary for determining handling measures, presenting the administrator with the need for taking handling measures or with a specific handling measure. Furthermore, the handling determining unit 405 detects the occurrence of a failure in a managed target so as to notify the administrator thereof, and predicts the occurrence of a failure.

The event managing unit 419 is a processing unit that detects the occurrence of an event before storing what is detected into an event table 418, to be discussed later, and retrieves from the event table 418 event information in response to an event acquisition request before returning the retrieved information.

The storage unit 406 is an area that stores the information under management of the management server. The storage unit 406 comprises the file system configuration table 407, virtual hard disk file size table 408, schedule table 409, schedule execution result table 410, a threshold value table 411, the virtual hard disk configuration table 412, file system volume table 413, a virtual server OS correspondence table 414, a virtual hard disk file system correspondence table 415, a handling measure table 416, an incident table 417, and the event table 418. It should be noted that these tables stored in the storage unit 406 are shown merely as one example of the table configuration; any other suitable scheme of representation may be adopted instead.

The file system configuration table 407 is a table that manages the configuration information about the file system 105, file system 108, and file system 113. FIG. 8 is a view showing an example of the file system configuration table 407. The file system configuration table 407 comprises a file system column 801, a host name column 802, a storage interface (hard disk I/F) column 803, and a disk device (disk drive) column 804. The records in the file system configuration table 407 store configured relations among the file system 105, file system 108, and file system 113.

The file system column 801 stores the identification information identifying the file systems. Any format may be used as long as it holds such identification information. The host name column 802 stores the host names of the OS hosts having the file systems stored in the file system column 801. For example, if the file system identified in the file system column 801 is the file system 105, then the host name of the guest OS 103 is stored into the host name column 802. And if the file system identified in the file system column 801 is the file system 107, the host name of the management OS 102 is stored into the host name column 802. The OS identifiers are not limited to host names; any other suitable identifier may be used as long as it identifies the OS.

The storage interface column 803 stores the identification information identifying the hard disk interface 306 connected with the disk device identified in the disk device column 804. Specifically, a controller type or a controller number is stored. The disk device column 804 stores the identifiers identifying the disk devices each configured with the file system identified in the file system column 801. If the file system identified in the file system column 801 is the file system 105, the identifier identifying the virtual hard disk 106 is stored into the disk device column 804.

The virtual hard disk file size table 408 is a table that stores the performance information about the virtual hard disk files 107 and virtual hard disks 106. The records in the hard disk file size table 408 store the performance information about virtual hard disks in effect at a given time of day. FIG. 6 is a view showing an example of the virtual hard disk file size table 408. The virtual hard disk file size table 408 comprises a time column 601, a virtual hard disk file (VHD file) column 602, a size column 603, and a maximum size column 604.

The time column 601 stores the times of day at which the performance information stored in the records was acquired. The virtual hard disk file column 602 stores the information identifying the virtual hard disk files 107. Any kind of information may be used as the identification information as long as it identifies the virtual hard disk files 107. The information may be internal identifiers for managing the virtual hard disk files 107 or may be names attached to the virtual hard disk files 107.

The size column 603 stores the file sizes of the virtual hard disk files 107. The maximum size column 604 stores the maximum file sizes of the virtual hard disk files 107. If the virtual hard disk files 107 are of the variable type, the file sizes cannot be expanded beyond these maximum file sizes. If the virtual hard disk files 107 are of the fixed type, their file sizes are approximately the same as the maximum file sizes. These maximum file sizes are equivalent to the disk sizes of the virtual hard disks 106 corresponding to the virtual hard disk files 107. For example, if a virtual hard disk 106 of the variable type having a disk size of 50 GB, a maximum file size of 50 GB, and a file size of 10 GB is assumed to be created, this virtual hard disk is recognized as a 50-GB disk on the guest OS 103.

The virtual hard disk file size table 408 is collected from the performance providing unit 119 of the management OS 102 and stored by the performance managing unit 402 through the interface 111. The records are collected at predetermined intervals so as to create the table. A list of the virtual hard disk files 107 located in a directory configured on the management OS 102 may be acquired so that individual performance information about each of the virtual hard disk files 107 belonging to the directory may be collected. Alternatively, using extensions of the virtual hard disk files 107 as the key, a search may be performed through the file system 108 and file system 113 to acquire the individual performance information about each of the virtual hard disk files 107. As another alternative, based on the content and header information of the files belonging to the file system 108 and file system 113, a search may be performed through the virtual hard disk files 107 so as to acquire their individual performance information.

The schedule table 409 is a table that stores the processing operations to be executed according to schedule on a managed target. Here, for example, the schedule table 409 stores optimization processing schedules for virtual hard disk files 107 and a launch schedule for a virtual server 101. The records in the schedule table 409 store a processing schedule each.

FIG. 14 is a view showing an example of the schedule table 409. The schedule table 409 comprises a schedule column 1401, a start time column 1402, an estimated end time column 1403, a server column 1404, and a command column 1405.

The schedule column 1401 stores the information identifying the processes to be executed according to schedule. The start time column 1402 stores the start times at which to start executing the processes according to schedule. The estimated end time column 1403 stores the estimated times at which to end the executing processes according to schedule. The server column 1404 stores the information identifying the hosts executing the processes according to schedule. The command column 1405 stores the content of the processes to be executed according to schedule. Here, the command column 1405 stores specific optimization processing commands, the virtual hard disk files 107 targeted to be optimized, a launch command for a virtual server 101, and the virtual server 101 to be launched thereby.

Figure 16:
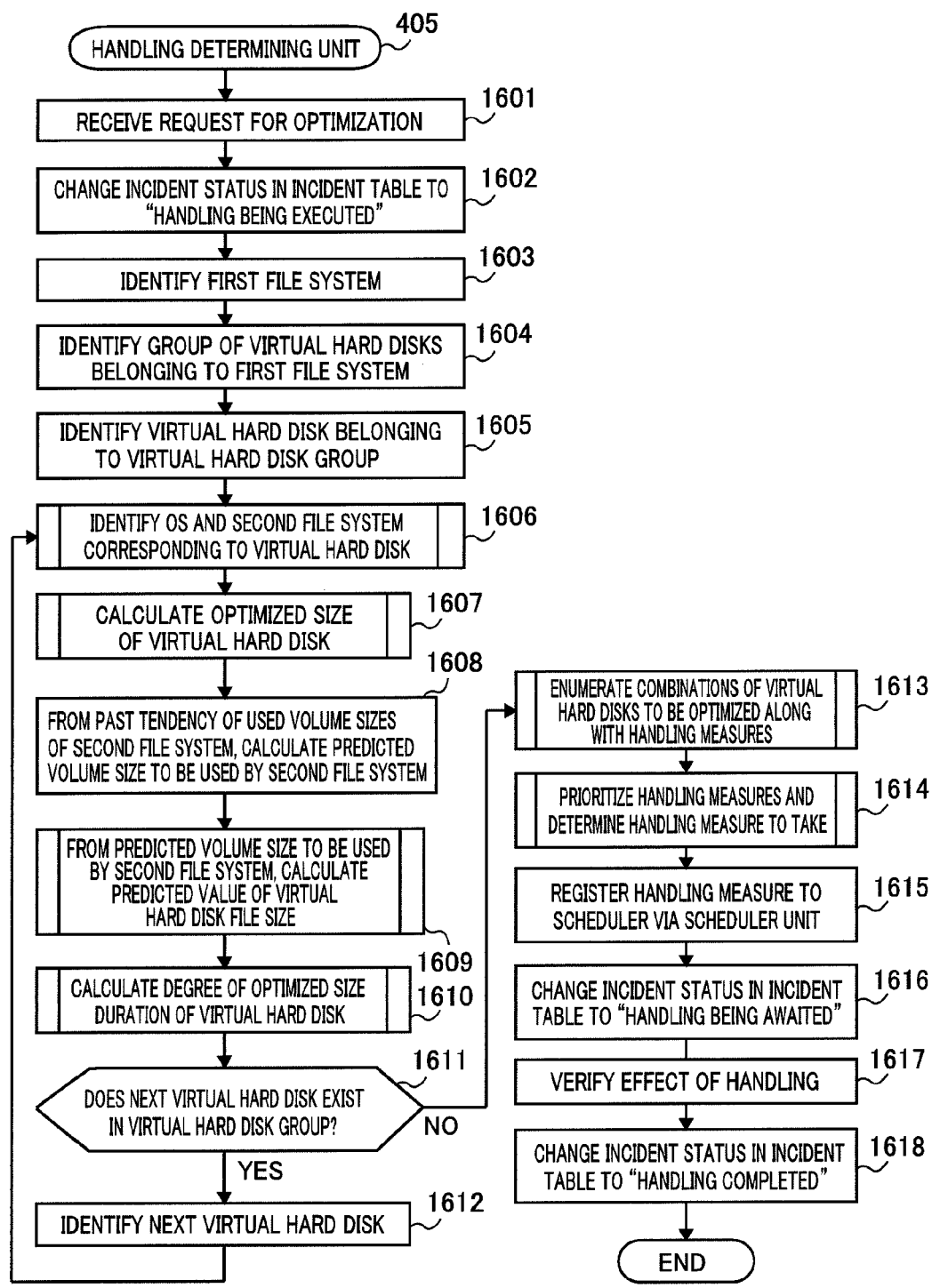
FIG. 16 is a flowchart of optimization processing operations performed by a handling determining unit 405.

The content of the schedule table 409 may be input either by the administrator or by the processing unit. FIG. 16 shows processing operations (to be explained not here but later) performed by the handling determining unit 405 for registering schedules through the schedule managing unit 405.

The schedule execution result table 410 is a table that stores the results of schedule execution processes executed on managed targets. The records in the schedule execution result table 410 store logs of the results of schedule execution.

FIG. 15 is a view showing an example of the schedule execution result table 410. The schedule execution result table 410 comprises a schedule result column 1501, a schedule column 1502, a start time column 1503, an end time column 1504, and an execution result status column 1505. The schedule result column 1501 stores the information identifying the results of schedule execution. The schedule column 1502 stores the information identifying the schedules. What is stored in the schedule column 1502 is made to correspond to the schedule column 1401 in the schedule table 409. The start time column 1503 stores the times of day at which schedule execution started. The end time column 1504 stores the times of day at which schedule execution ended. The execution result status column 1505 stores status of the results of schedule execution. If the schedule execution succeeds, an entry "Success" is stored; if the execution fails, an entry "Fail" is stored. The content of the schedule execution result table 410 is input on the basis of the results of the schedule execution performed by the schedule managing unit 403.

The threshold value table 411 is a table that stores conditions and the actions in effect when the conditions are met. The records in the threshold value table 411 store the conditions paired with the actions.

FIG. 11 is a view showing an example of the threshold value table 411. The threshold value table 411 comprises a threshold value ID column 1101, a target column 1102, a condition column 1103, and an action column 1104. The threshold value ID column 1101 stores the information identifying each pair of a condition and an action. The target column 1102 stores the information identifying the targets subject to determination based on threshold values. The condition column 1103 stores the conditions for the determination based on threshold values. The action column 1104 stores the actions to be executed when the conditions are satisfied as a result of the determination based on threshold values. The targets, conditions, and actions in the threshold value table 411 are assumed to be input by the administrator beforehand.

The virtual hard disk configuration table 412 is a table that stores the configuration information about the virtual hard disk files 107. The records in the virtual hard disk configuration table 412 store individual configuration information about each of the virtual hard disk files 107.

FIG. 7 is a view showing an example of the virtual hard disk configuration table 412. The virtual hard disk configuration table 412 comprises a virtual hard disk file (VHD file) column 701, a virtual server (VM) column 702, a storage interface (hard disk I/F) column 703, a type column 704, an in-use flag column 705, a server column 706, a file system (FS) column 707, and a path (Path) column 708.

The virtual hard disk file column 701 stores the information identifying the virtual hard disk files 107. The virtual server 702 stores the information identifying the virtual servers 101. The column stores the virtual servers 101 related to the virtual hard disk files 107 identified in the virtual hard disk file column 701. Specifically, the virtual servers 101 mounted and launched and the virtual servers 101 mounted but yet to be launched are stored. The storage interface column 703 stores the information identifying the virtual hard disk interface 306 possessed by the virtual servers 101. The hard disk interface 306 is in the possession of the virtual server 101 identified in the virtual server column 702, and is the location on which is mounted the virtual hard disk file 107 identified in the virtual hard disk file column 701.

The type column 704 stores the types of the virtual hard disk files 107 identified in the virtual hard disk file column 701. Specifically, the types are made up of the variable type and the fixed type. The variable type is a type which keeps the file size equivalent to the total volume of a given virtual hard disk 106 from getting secured when that virtual hard disk is created and which, when the used size of the virtual hard disk 106 grows, allows the size of the virtual hard disk file 107 to be increased correspondingly. The fixed type is a type that allows the file size equivalent to the total volume of the virtual hard disk 106 to be secured upon creation of the virtual hard disk file. Here, the variable type is represented by "Dynamic" and the fixed type by "Fix."

The in-use flag 705 stores flags each indicating whether a virtual hard disk file 107 is in use. The in-use (True) flag indicates the state in which the hard disk file 107 is being used, e.g., the state in which a virtual server 101 with the virtual hard disk file 107 mounted thereon is being launched. Conversely, the not-in-use (False) flag indicates the state where there is no virtual server 101 on which to mount a virtual hard disk file 107 or the state where the virtual hard disk file 107 is mounted on a virtual server 101 that has yet to be launched.

The server column 706 stores the identification information identifying the physical server 100 holding the virtual hard disk files 107. Any kind of information may be used as the identification information as long as it identifies the physical server. Here, the host name of the physical server 100 is stored.

The file system column 707 stores the information identifying the file system 108 or file system 113 holding the virtual hard disk files 107. For example, if the file system 108 identified by "FS 0" on the physical server 100 having a host name "p-Serv01" holds a virtual hard disk file 107 identified by "VHD file 1," then "VHD file" is stored into the virtual hard disk column 701, "p-Serv01" into the server column 706, and "FS 0" into the file system column 707.

The path column 708 stores the paths to the directories where the virtual hard disk files 107 are held.

The file system volume table 413 is a table that stores file system performance information. FIG. 5 is a view showing an example of the file system volume table 413. The records in the file system volume table 413 store the performance information about the file systems at given times of day. The file system volume table 413 comprises a time column 501, an OS column 502, a file system column 503, a total volume size (Total) column 504, a used volume size (Used) column 505, and a free volume size (Free) column 506.

The time column 501 stores the times of day at which the performance information about file systems was acquired.

The OS column 502 stores the identification information identifying the OS's managing the file systems. The identification information may include host names. Some suitable identification information other than the host names may be used instead. Here, with the file system 105, the host name of the guest OS 103 is stored; with the file system 108, the host name of the management OS 102 is stored. The file system column 503 stores file system identification information.

The total volume size column 504 stores the total volume sizes of the file systems identified in the OS column 502 and file system column 503. The sum of the value in the used volume size column 505 and the value in the free volume size column 506 amounts to the value in the total volume size column 504. The used volume size column 505 stores the used sizes of the file systems identified in the OS column 502 and file system column 503. The free volume size column 506 stores the free sizes of the file systems identified in the OS column 502 and file system column 503.

The values of the file system volume table 413 are collected at predetermined intervals by the performance managing unit 402. The performance managing unit 402 collects information from the performance providing unit 117 through the interface 104 or gathers information from the performance providing unit 119 through the interface 104.

The virtual server OS correspondence table 414 is a table that stores the relations of correspondence between the virtual servers 101 on the one hand and the guest OS 103 operating on the virtual servers 101 on the other hand. FIG. 10 is a view showing an example of the virtual server OS correspondence table 414. The virtual server OS correspondence table 414 comprises a virtual server (VM) column 1001 and a host name column 1002.

The virtual server column 1001 stores the information identifying the virtual servers 101. Any kind of information may be used as the identification information as long as it identifies the virtual servers 101; it may be individual identification information (VMID) held internally by the server virtualizing program 109 with regard to each virtual server 101, or it may be the names (VM names) given to the virtual servers 101 by the administrator. The host name column 1002 stores the information identifying the guest OS 103. Any kind of information may be used as the identification information as long as it identifies the guest OS 103; it may be the name given to the guest OS 103 by the administrator or by the user, or it may be identification information held internally by the guest OS 103. For example, the identification information may be a host name or SID.

The values of the virtual server OS correspondence table 414 may be the relations of correspondence input by the administrator, or the relations of correspondence input on the basis of the configuration information managed by the configuration managing unit 401. It is possible to create the relations of correspondence between the guest OS 103 and the virtual servers 101 by collecting the relations of correspondence between the MAC addresses gathered from the configuration providing unit 118 via the interface 104 on the one hand and the identification information identifying the guest OS 103 on the other hand, and the relations of correspondence between the MAC addresses collected through the interface 111 on the one hand and the identification information identifying the virtual servers 101 on the other hand, and by matching the collected relations of correspondence using the MAC addresses as the key. It is also possible to create the relations of correspondence using means of communication between service programs, not shown, operating on the guest OS 103 on the one hand and the server virtualizing program 109 on the other hand.

The virtual hard disk file system correspondence table 415 stores the relations of correspondence between the virtual hard disk files 107 on the one hand and the file systems 105 built on the virtual hard disks 106 implemented by the virtual hard disk files 107 on the other hand. The records in the virtual hard disk file system correspondence table 415 store the relations of correspondence between the virtual hard disk files 107 and the file systems 105. FIG. 9 is a view showing an example of the virtual hard disk file system correspondence table 415. The virtual hard disk file system correspondence table 415 comprises a virtual hard disk file (VHD file) column 901 and a file system (FS) column 902.

The virtual hard disk file column 901 stores the information identifying the virtual hard disk files 107. Any kind of information may be used as the identification information as long as it identifies the virtual hard disk files 107. The file system column 902 stores the information identifying the file system 105. Any kind of information may be used as the identification information as long as it identifies the file system 105. This column stores the file systems 105 built on the virtual hard disks 106 corresponding to the virtual hard disk files 107 identified in the virtual hard disk file column 901. The virtual hard disk file system correspondence table 415 is created by the configuration managing unit 401 executing the processing of the flowchart in FIG. 17, to be discussed later.

The handling measure table 416 is a table that stores the handling measures for handling incidents. This table mainly stores the handling measures that use optimization processing on the incidents with the file system 108 and file system 113. FIG. 13 is a view showing an example of the handling measure table 416. The handling measure table 416 comprises a handling measure column 1301, a virtual hard disk column 1302, an optimization start time column 1303, a physical server column 1304, a weight column 1305, and executability flags 1306.

The handling measure column 1301 stores the information identifying handling measures. The virtual hard disk column 1302 stores the information identifying the virtual hard disk files 107. This column stores the targets subject to handling processing. The optimization start time column 1303 stores the times of day at which to start executing the handling processing. This column stores the times of day at which to start executing optimization processing. The physical server column 1304 stores the information identifying the physical servers 100. This column stores the information designating the hosts that execute optimization processing as the handling processing. In practice, the optimizing unit 112 on the physical server 100 performs the optimization processing.

The weight column 1305 stores the priorities (weights) of optimizing measures. Where there exist a plurality of optimizing measures for achieving the purpose, the handling measure is determined on the basis of the priority stored in this column. Here, the larger the value stored in the column, the higher the priority. The executability flags 1306 store flag information indicating whether each of the handling measures cited is executable or not. For example, a handling measure is not executable if it renders the load on the physical server inordinately high through optimization processing although the measure is shown covering a list of virtual hard disk files which, when optimized, are supposed to secure a free volume size of the file system 108. Here, a "True" flag is stored to represent an executable handling measure, and a "False" flag is stored to denote a non-executable handling measure. The handling measure table 416 is created by the handling determining unit 405 carrying out the processing operations shown in the flowchart of FIG. 16.

The incident table 417 is a table that stores incidents. The incidents registered in this table include a system failure occurrence incident and a system failure prior warning detection incident. Also registered are maintenance incidents that are scheduled and more extensive in scope than common incidents. The records in the incident table 417 store incidents and the status of how the incidents are handled.

FIG. 12 is a view showing an example of the incident table 417. The incident table 417 comprises an incident ID column 1701, a registration time (time of occurrence) column 1702, a handling deadline time column 1703, an incident content column 1704, a status column 1705, and an event ID column 1706.

The incident ID column 1701 stores the information identifying the incidents. The registration time column 1702 stores the times of day at which the incidents identified in the incident ID column 1701 were registered. The registration times are the times of day at which the incidents occurred. The handling deadline time column 1703 stores the deadlines by which the incidents identified in the incident column 1701 are to be resolved. The incident content column 1704 stores the content of the incidents identified in the incident column 1701.

The status column 1705 stores the status of the incidents identified in the incident ID column 1701. The status typically refers to status in which a problem is detected, status in which the cause of the problem is analyzed, status in which handling measures are determined, status in which execution of the handling measures is awaited, status in which the problem has been resolved, etc. The event ID column 1706 stores the information identifying the events related to the incidents. If an incident is considered registered when an event stored in the event ID column 1706 is issued, then the event is stored in relation to the registered incident. The values of the incident table 417 may be input either by the administrator or by the handling determining unit 405 or some other processing unit. FIG. 16 explains the processing operations (to be discussed not here but later) performed by the handling determining unit 405 for changing handling status.

The event table 418 is a table that manages the events created by managed targets. The records in the event table 418 store the created events. Managed here are the events created as a result of the determination with the threshold value table 411. FIG. 24 is a view showing an example of the event table 418. The event table 418 comprises an event ID column 2401, a threshold value ID column 2402, an object column 2403, and a time column 2404. The event ID column 2401 stores the information identifying the events. The threshold value ID column 2402 stores the information identifying the threshold value conditions by which events were determined to have occurred. What is stored here is made to correspond to the threshold value ID column 1101 in the threshold value table 411. The object column 2403 stores the objects from which the events occurred. If an event is determined to have occurred based on threshold values, then the target for threshold value determination is stored in this column. The time column 2404 stores the times of day at which the events occurred. The information in the event table 418 is stored by the event managing unit 419 having detected the occurrence of the events.

The control terminal 114 is a computer that inputs and outputs management information to and from the management server 110. Through the control terminal 114, the administrator inputs or outputs management information or issues processing execution requests to managed targets. The control terminal 114 includes an input/output unit 123. The input/output unit 123 receives the input from the administrator, and inputs information to the management server 110 via the network 115. Also, the input/output unit 123 receives information from the management server 110, and outputs the information to the administrator.

FIG. 16 is a flowchart of the optimization processing operations performed by the handling determining unit 405.

(1) The handling determining unit 405 receives an optimization processing request from the control terminal 114 (step 1601).

(2) The handling determining unit 405 identifies an incident from the optimization processing request, and changes the incident status in the incident table 417 to that of handling being executed (step 1602).

(3) The handling determining unit 405 identifies the file system 108 or file system 113 (step 1603). In FIG. 16, the file system 108 or 113 is indicated as a first file system.

(4) The handling determining unit 405 identifies a group of virtual hard disk files 107 belonging to the file system 108 or file system 113 identified in step 1603 (step 1604).

(5) The handling determining unit 405 identifies one virtual hard disk file 107 belonging to the group of virtual hard disk files 107 identified in step 1604 (step 1605).

(6) The handling determining unit 405 identifies the guest OS 103 and file system 105 corresponding to the virtual hard disk file 107 identified in steps 1605 and 1612 (step 1606). In FIG. 16, the file system 105 is indicated as a second file system. The process of step 1606 will be explained later in detail using FIG. 17.

(7) The handling determining unit 405 calculates an optimized size of the virtual hard disk file 107 identified in steps 1605 and 1612 (step 1607). The optimized size is a minimum file size attained through optimization processing. The process of step 1607 will be explained later in detail using FIG. 20.

(8) From the past tendency of the used volume sizes of the file system 105 identified in step 1606, the handling determining unit 405 calculates the volume size to be used in the future by the file system 105 (step 1608). For example, from the past history of used volume sizes growing progressively, the volume size to be used in the future may be calculated to be on the increase accordingly. Conversely, if the past tendency of used volume sizes was on the decrease, the volume size to be used in the future may be calculated to be on the decrease correspondingly. These sizes may be calculated using common techniques for linear prediction based on the used volume sizes measured periodically in the past. As another example, the volume size to be used in the future may be calculated from the past history of used volume sizes in a cyclical trend. That size can be calculated using common techniques for periodical prediction based on the used volume sizes measured periodically in the past.

(9) From the predicted value of the used volume size of the file system 105 calculated in step 1608, the handling determining unit 405 calculates a predicted file size value of the virtual hard disk file 107 identified in steps 1605 and 1612 (step 1609). The process of step 1609 will be explained later in detail using FIGS. 18A and 18B.

(10) The handling determining unit 405 calculates the degree of duration of the optimized size of the virtual hard disk file 107 identified in steps 1605 and 1612 (step 1610). In this context, the degree of duration is an indicator indicative of how long the optimized and secured file size can last. The process of step 1610 will be explained later in detail using FIG. 21.

(11) The handling determining unit 405 determines whether there exists any virtual hard disk 107 not identified in step steps S1605 and 1612 within the virtual hard disk group identified in step 1604 (step 1611). If any such virtual hard disk 107 is determined to exist, then step 1612 is reached. If no such virtual hard disk 107 is determined to exist, step 1613 is reached.

(12) The handling determining unit 405 identifies the next virtual hard disk file 107 belonging to the group of virtual hard disks 107 identified in step 1604 (step 1612), and passes control to step 1606.

(13) Out of the virtual hard disks 107 belonging to the virtual hard disk group identified in step 1604, the handling determining unit 405 enumerates the combinations of the virtual hard disks to be optimized along with handling measures (step 1613). The process of step 1613 will be explained later in detail using FIGS. 22A, 22B and 22C.

(14) If there exist a plurality of handling measures enumerated in step 1613, the handling determining unit 405 prioritizes each of the handling measures and determines the handling measure to take (step 1614). The process of step 1614 will be explained later in detail using FIGS. 23A and 23B.

(15) The handling determining unit 405 registers to a scheduler the handling measure determined in step 1614 through the schedule managing unit 403 (step 1615). Upon receipt of a registration request from the handling determining unit 405, the schedule managing unit 403 creates a new record in the schedule table 409, and registers to the start time column 1402 an optimization time to be acquired in step 2309. An estimated end time to be calculated in step 2310 is registered to the estimated end time column 1403. Registered to the command column 1405 is an optimization command made up of an optimization command name (that may include a command path) and the name of the virtual hard disk file 107 (that may include a directory path) targeted to be optimized.

(16) In the incident table 417, the handling determining unit 405 changes the status 1705 of the incident identified in step 1601 to "handling in progress" (step 1616).

(17) On detecting the completion of handling execution, the handling determining unit 405 verifies the effect of the executed handling (step 1617). Here, the handling determining unit 405 detects handling execution completion the moment the result of the execution corresponding to the schedule registered in step 1615 is registered to the schedule execution result table 410. The effect is verified by referencing the corresponding threshold value condition 1103 in the threshold value table 411 to determine whether the condition expression in question is no longer satisfied. The threshold value condition 1103 is referenced as follows: An event is first identified from the event ID column 1706 in the incident table 418. A search is then made through the event ID column 2401 in the event table 418 to reference the threshold value ID column 2402 of the matching record so as to acquire the threshold value ID. A search is made through the threshold value ID column 1101 in the threshold value table 411 to reference the condition column 1103 of the record that matches the threshold value ID.

(18) If it is determined that the handling was effective as a result of the verification in step 1617, the handling determining unit 405 changes to "handling completed" the status of the incident identified in step 1601 in the incident table 417 (step 1618). This step completes the flow of this processing.

FIG. 17 is a flowchart showing the processing operations performed by the configuration managing unit 401 for identifying the file system 105 from a virtual hard disk file 107. This is a detailed flowchart of the process performed by the configuration managing unit 401 upon receipt of the request from the handling determining unit in step 1606 of FIG. 16.

(1) The configuration managing unit 401 receives the request to acquire the file system 105 corresponding to a virtual hard disk file 107, and identifies the virtual hard disk file 107 included in the request (step 1701).

(2) The configuration managing unit 401 determines whether or not the virtual hard disk file 107 is in use (step 1702). Specifically, a search is performed through the virtual hard disk file column 701 in the hard disk file configuration table 412 using the virtual hard disk file 107 identified in step 1701 as the key, and a reference is made to the in-use flag column 705 of the matching record. If the in-use flag column 705 contains "True," the virtual hard disk file 107 is determined to be in use; if the column 705 contains "False," the virtual hard disk file 107 is determined to be out of use. If the file is determined to be in use, step 1703 is reached. If the file is determined to be out of use, step 1709 is reached.

(3) The configuration managing unit 401 identifies the virtual server 101 to which the virtual hard disk file 107 is connected, and the hard disk interface 306 possessed by the virtual server 101 (step 1703). In FIG. 17, the virtual hard disk interface 306 is indicated as a first storage interface. Specifically, a search is made through the virtual hard disk file column 701 in the virtual hard disk file configuration table 412 using the virtual hard disk file 107 identified in step 1701 as the key, so as to acquire the values in the virtual server column 702 and hard disk interface column 703 of the matching record.

(4) The configuration managing unit 401 identifies the guest OS 103 operating on the virtual server 101 (step 1704). Specifically, a search is performed through the virtual server column 1001 in the virtual server OS correspondence table 414 using the identifier of the virtual server 101 acquired in step 1703 as the key, and a reference is made to the value in the host name column 1002 of the matching record so as to identify the guest OS 103.

(5) Using the hard disk interface identified in step 1703 (i.e., first storage interface) as the key, the configuration managing unit 401 identifies the hard disk interface (second storage interface) managed by the guest OS 103 (step 1705). Specifically, a search is made through the host name column 802 in the file system configuration table 407 using the host name identified in step 1704 as the key. Given the matching record, a search is performed through the hard disk interface column 803 using the identifier of the hard disk interface acquired in step 1703 as the key so as to identify the hard disk interface. Even if the format of the hard disk interface fails to match, the matching hard disk interface may be identified based on the interface type (SCSI, IDE, etc.) and interface number, for example. Alternatively, the hard disk interface may be identified from the total volume size of the connected disks.

(6) The configuration managing unit 401 identifies the disk device to be connected to the hard disk interface identified in step 1705 (step 1706). Specifically, the disk device is identified by acquiring the value in the disk device column 804 of the record identified by the search through the file system configuration table 407 in step 1705. The disk device identified here is the virtual hard disk 106 corresponding to the virtual hard disk file 107.

(7) The configuration managing unit 401 identifies the file system 105 built on the disk device identified in step 1706 (step 1707). Specifically, the file system 105 is identified by acquiring the value in the file system column 801 of the record identified by the search through the file system configuration table 407 in step 1705. The file system 105 identified here is the file system 105 built on the virtual hard disk 106 corresponding to the virtual hard disk file 107. If there exist a plurality of partitions on the virtual hard disk 106, each partition having a file system 105 built thereon, then a plurality of file systems 105 are identified here.

(8) The configuration managing unit 401 responds to the processing unit that requested the file system 105 identified in step 1707 (step 1708), and terminates the processing.

(9) The configuration managing unit 401 determines whether or not the virtual hard disk file 107 was in use in the past (step 1709). Specifically, a search is made through the virtual hard disk file column 701 of the past records in the virtual hard disk configuration table 412 using the virtual hard disk file 107 identified in step 1701 as the key. If any of the matching records has "True" in the in-use flag column 705, the virtual hard disk file 107 is determined to have been in the in-use state; if none of the matching records is "True," then the virtual hard disk file 107 is determined not to have been in the in-use state in the past. If the file is determined to have been in the in-use state, step 1710 is reached; if the file is determined not to have been in the in-use state, step 1715 is reached. A file having been not in the in-use state means, for example, that a virtual hard disk file 107 was created but not related to any server so as to be launched, whereby no file system is determined to have been built.

(10) The configuration managing unit 401 references the information in effect in the in-use state, so as to identify the virtual server 101 to which the virtual hard disk file 170 is connected and the virtual hard disk interface possessed by the virtual server 101 (step 1710). The information in effect in the in-use state refers to the most recently stored record which was hit during the search in step 1709, which was matched in the virtual hard disk file column 701, and which has "True" in the in-use flag column 705. The values in the virtual server column 702 and hard disk interface column 703 of the record in question are then acquired so as to identify the virtual server 103 and hard disk interface 306.

(11) The configuration managing unit 401 references the information in effect in the in-use state so as to identify the guest OS 103 corresponding to the virtual server 103 (step 1711).

Specifically, a search is made through the past information in the virtual server OS correspondence table 414 so as to identify a matching record in the virtual server column 1001 using the virtual server 103 identified in step 1710 as the key, whereby the value stored in the host name column 1002 of the record in question is acquired. It is necessary that the past information in the virtual server OS correspondence table 414 should match the registration time of the past record identified in step 1710 or should be considered to match that time (within such a range as to permit the guest OS operating on the virtual server 101 at the time of the record identified in step 1710 to be identified). If the times do not match completely, then the records before and after the record identified in step 1710 may be referenced from the virtual server OS correspondence table 414. If the host name column 1002 of a preceding or subsequent record has the same character string, then that character string may be acquired.

(12) The configuration managing unit 401 references the information in effect in the in-use state so as to identify an interface which corresponds to a hard disk interface and which forms the hard disk interface managed by the guest OS 103 (step 1712). Specifically, a reference is made to the past information in the file system configuration table 407, and a search is performed through the host name column 803 using the host name identified in step 1711 as the key, whereby the content in the hard disk interface column 802 of the matching record is acquired. Here, the past information needs to match the time of the record identified in step 1711 or be within such a range as to be considered to match that time.

(13) The configuration managing unit 401 references the information in effect in the in-use state so as to identify the disk device to be connected to the hard disk interface (step 1713). Specifically, the content in the disk device column 407 of the record identified by the search through the file system configuration table 407 in step 1712 is acquired. The disk device identified here is the corresponding virtual hard disk 106 in effect when the virtual hard disk file 107 was most recently used.

(14) The configuration managing unit 401 references the information in effect in the in-use state so as to identify the file system 105 on the disk device (step 1714). Specifically, the content in the file system column 801 of the record identified by the search through the file system configuration table 407 in step 1712 is acquired. The file system 105 identified here is the corresponding file system 105 in effect when the virtual hard disk file 107 was most recently used. Since there are cases where the virtual hard disk 106 is divided into a plurality of partitions each having a file system 105 built thereon, a plurality of file systems 105 may be identified here. After the identification of the file system, step 1708 is reached.

(15) The configuration managing unit 401 responds to the requesting processing unit by informing that there is no file system corresponding to the virtual hard disk file 107 identified in step 1701 (step 1715), and terminates the processing.

Figure 18A:
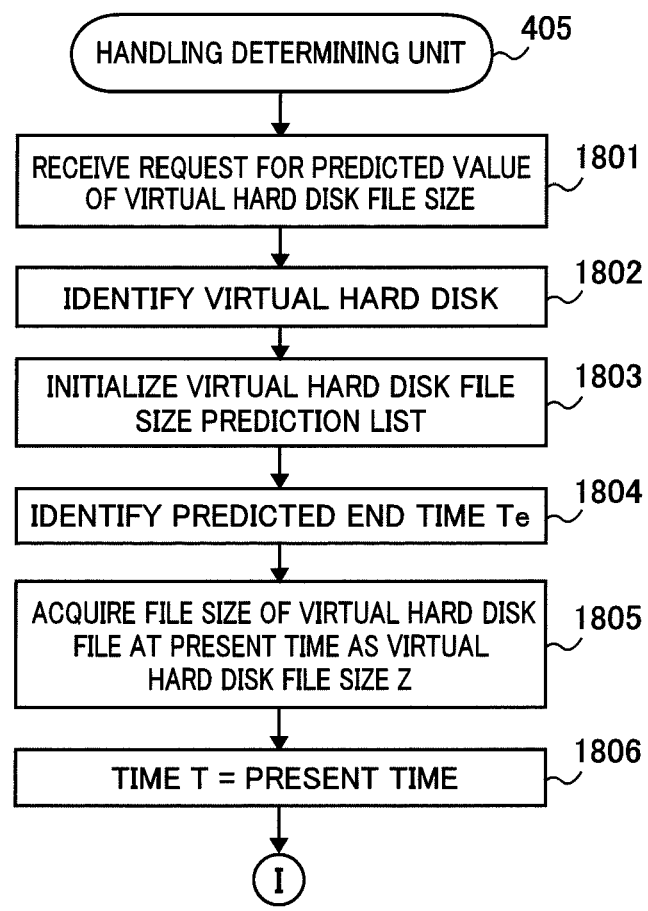
FIG. 18A is a flowchart showing processing operations performed by the handling determining unit for predicting a future file size of a virtual hard disk file.
Figure 18B:
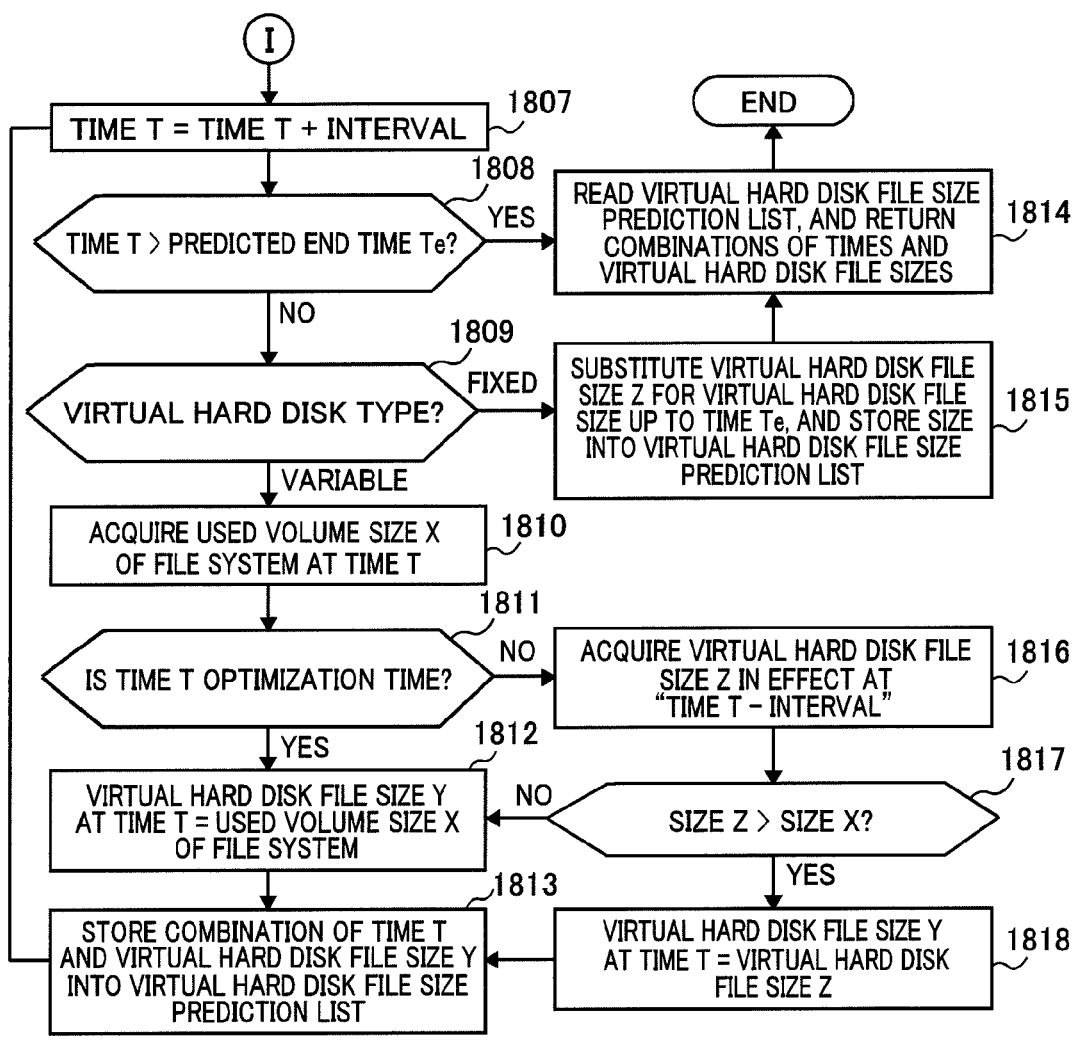
FIG. 18B is a flowchart showing processing operations performed by the handling determining unit 405 for predicting a future file size of a virtual hard disk file.

FIGS. 18A and 18B are flowcharts showing the processing operations performed by the handling determining unit 405 for predicting a future file size of a virtual hard disk file 107.

(1) The handling determining unit 405 receives a request to predict the future file size of a virtual hard disk file 107 (step 1801).

(2) The handling determining unit 405 identifies the virtual hard disk file 107 from the request (step 1802).

(3) The handling determining unit 405 initializes a virtual hard disk file size prediction list (step 1803). The virtual hard disk file size prediction list refers to temporary list variables for storing the predicted values of the file size of the requested virtual hard disk file 107. The list variables, not shown, are stored on the main memory 303. The prediction list is not limited to the list variables; other suitable variables may be used as long as they provide a temporary storage area.

(4) The handling determining unit 405 identifies a predicted end time Te (step 1804). The predicted end time Te refers to the end time up to which the file size of the virtual hard disk file 107 is predicted. What is predicted is the file size from the present time up to the predicted end time Te. The predicted end time Te may be either the time of day at the end of a predetermined time period or the time of day identified upon receipt of input from the administrator.

(5) The handling determining unit 405 acquires the file size of the present time (step 1805). What is acquired here is assumed provisionally to be a virtual hard disk file size Z.

(6) The handling determining unit 405 acquires the present time and substitutes it for a time variable T (step 1806). Here, the time of day of interest is written to the time variable T but is not limited thereto.

(7) The handling determining unit 405 substitutes the sum of the time variable T and an interval value for the time variable T (step 1807). Any method may be used here as long as it permits calculation of a predicted periodical value based on a given interval value. The interval may be the same as the sampling interval of virtual hard disk files in the past, or a value different therefrom. Alternatively, an interval stored beforehand may be used.

(8) The handling determining unit 405 compares the time variable T with the predicted end time Te (step 1808). If the time variable T is later than the predicted end time Te, step 1804 is reached; if the time variable T is earlier than the predicted end time Te, then step 1809 is reached.

(9) The handling determining unit 405 determines the type of the virtual hard disk file 107 identified in step 1802 (step 1809). Specifically, a search is made via the configuration managing unit 401 through the virtual hard disk file column 701 in the virtual hard disk configuration table 412, so as to acquire the type column 704 of the record that matches the virtual hard disk file 107 identified in step 1802. If the type column contains "Dynamic," the variable type is determined; if the type column contains "Fix," the fixed type is determined. With the variable type, step 1810 is reached; with the fixed type, step 1815 is reached.

(10) The handling determining unit 405 acquires the used volume size (X) of the file system 105 in effect at the time of the time variable T (step 1810). Specifically, what is acquired is the value of the time of the time variable T from among the predicted values of the used volume sizes of the file systems 105 predicted in step 1608.

(11) The handling determining unit 405 determines whether or not the time of the time variable T is an optimization time (step 1811). The optimization time refers to a scheduled time at which to execute an optimization process on the virtual hard disk file 107 identified in step 1802. What is used here is the optimization time determined by the administrator or by the handling determining unit 405. If no time of day is designated, the present time or the time of day at the end of a default time may be used. If the time of day of the time variable T is the optimization time, step 1812 is reached; if the time of day of the time variable T is not the optimization time, then step 1816 is reached.

(12) The handling determining unit 405 takes a predicted file size value (Y) of the virtual hard disk file 107 in effect at the time variable T as the same as the used volume size (X) of the file system 105 in effect at the time variable T acquired in step 1810 (Y=X)(step 1812). This process signifies that because the used volume size of the file system becomes larger than the file size of the virtual hard disk file 107, the virtual hard disk file 107 is predicted to be expanded.

(13) The handling determining unit 405 stores into the virtual hard disk file size prediction list the predicted file size value (Y) of the virtual hard disk file 107 in effect at the time of the time variable T, and returns to step 1807.

(14) The handling determining unit 405 reads the content of the virtual hard disk file prediction list, and returns the combinations of the times and the file sizes (step 1814). This process involves responding to the processing unit that made the request in step 1801 by returning thereto the predicted file size values in effect from the present up to the future time Te of the designated virtual hard disk file 107. After step 1814, this processing flow is terminated.

(15) The handling determining unit 405 substitutes the file size (Z) of the virtual hard disk file 107 acquired in step 1805 for the predicted file size value (Y) of the virtual hard disk file 107 in effect up to the time variable Te, and stores the value into the virtual hard disk file size prediction list (step 1815). If the virtual hard disk file 107 is of the fixed type, the file size remains unchanged in the future, so that the current file size is taken unchanged as the future file size. After step 1815, step 1814 is reached.

(16) The handling determining unit 405 acquires the file size (Z) of the virtual hard disk file 107 in effect one interval earlier than the time of the time variable T (step 1816). Specifically, if the time one interval earlier precedes the present time, then a search is made through the virtual hard disk file column 602 in the virtual hard disk file size table 408 for the record that matches the virtual hard disk file identified in step 1802, so as to acquire the size column 603 of the record in effect one interval earlier in the time column 601. If the time one interval earlier is a time of day in the future, a search is performed through the virtual disk file prediction list for the combination in effect on interval earlier so as to acquire the file size. This process signifies that the optimization process, when executed, predicts that the file size of the virtual hard disk file 107 will be reduced to the used volume size of the file system 105 at the time of the time variable T.

(17) The handling determining unit 405 compares the file size (Z) acquired in step 1816 with the used volume size (X) acquired in step 1810 (step 1817). If the comparison reveals that the file size (Z) acquired in step 1816 is larger than the used volume size (X), step 1812 is reached; if the comparison shows that the file size (Z) acquired in step 1816 is equal to or smaller than the used volume size (X), then step 1818 is reached.

(18) The handling determining unit 405 takes the file size (Y) of the virtual hard disk file 107 in effect at the time of the time variable T as the same as the file size (Z) acquired in step 1816 (Y=Z)(step 1818). This process signifies that because the used volume size of the file system does not become larger than the file size of the virtual hard disk file, the file size is predicted not to be expanded at the time of the time variable T. Upon completion of the process of step 1818, step 1813 is reached.

Figure 19:
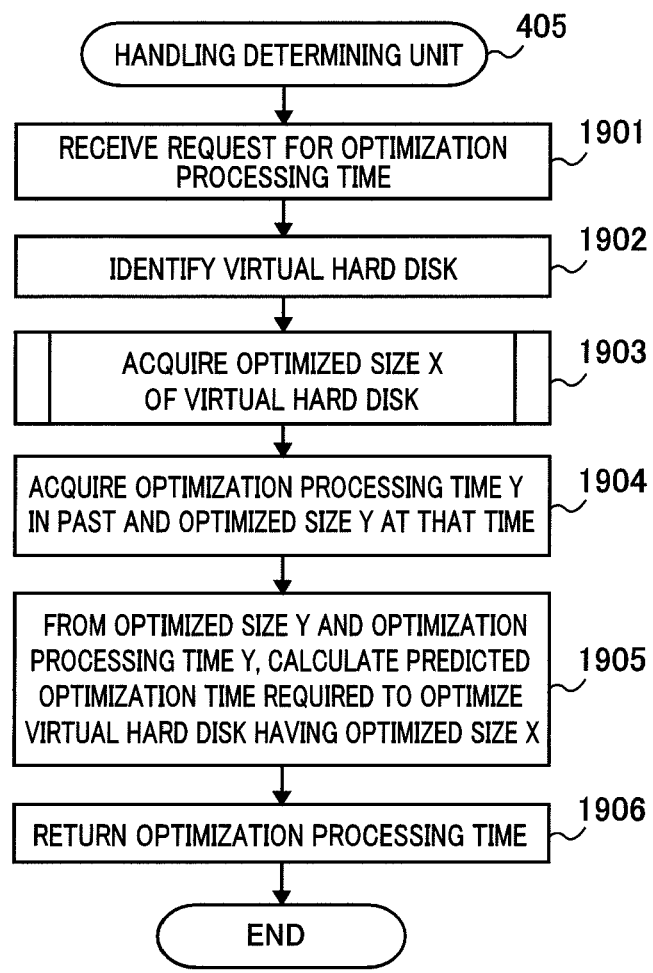
FIG. 19 is a flowchart showing processing operations performed by the handling determining unit for estimating an optimization processing time of a virtual hard disk file.

FIG. 19 is a flowchart showing the processing operations performed by the handling determining unit 405 for estimating an optimization processing time of a virtual hard disk file.

(1) The handling determining unit 405 receives a request to calculate an optimization processing time (step 1901).

(2) From the request received in step 1901, the handling determining unit 405 identifies the virtual hard disk file 107 (step 1902).

(3) The handling determining unit 405 acquires an optimized size (X) of the virtual hard disk file 107 identified in step 1902 (step 1903). The processing operations in step 1903 will be explained later in detail using FIG. 20.

(4) The handling determining unit 405 acquires the optimization processing time (time Y) of the virtual hard disk file in the past and the optimized size thereof (size Y) at that time (step 1904).

(5) From the optimized size (size Y) and optimization processing time (time Y) acquired in step 1904, the handling determining unit 405 calculates the optimization processing time for the optimized size (X) acquired in step 1903, and takes the calculated time as the estimated optimization processing time of the virtual hard disk file 107 identified in step 1902 (step 1905). Common calculation methods such as linear prediction may be used for the estimation. Although the optimization processing time is estimated here based on the optimized size, the optimization processing time may be estimated alternatively on the basis of the file size of the virtual hard disk file 107. In this case, the file size of the virtual hard disk file 107 is acquired in step 1903 instead of the optimized size being calculated therein. As another alternative, the optimization processing time may be estimated based on the optimized size and on the file size of the virtual hard disk file 107.

(6) The handling determining unit 405 returns the optimization processing time calculated in step 1906 (step 1906), and terminates the processing.

Figure 20:
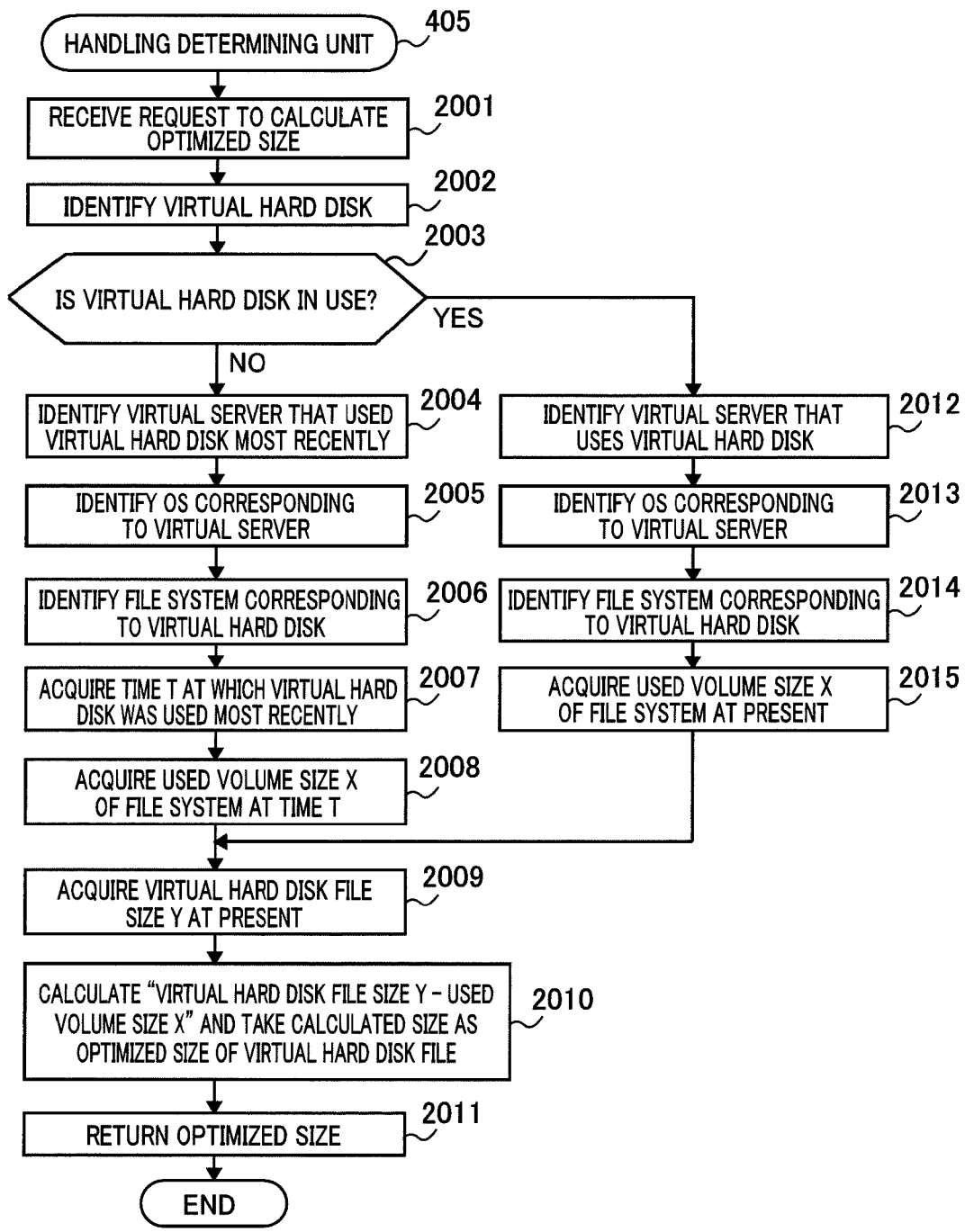
FIG. 20 is a flowchart showing processing operations performed by the handling determining unit for calculating an optimized size of a virtual hard disk file.

FIG. 20 is a flowchart showing the processing operations performed by the handling determining unit 405 for calculating an optimized size of a virtual hard disk file.

(1) The handling determining unit 405 receives a request to calculate the optimized size of a virtual hard disk file 107 (step 2001).

(2) From the request received in step 2001, the handling determining unit 405 identifies the virtual hard disk file 107 targeted to be calculated (step 2002).

(3) The handling determining unit 405 determines whether or not the virtual hard disk file 107 identified in step 2002 is in use (step 2003). The determination of being in use or not is performed by getting the configuration managing unit 401 to search the virtual hard disk file column 701 in the virtual hard disk configuration table 412 for the in-use flag column 705 of the record that matches the virtual hard disk file identified in step 2002. If the flag column contains "True," the virtual hard disk file is determined to be in use; if the flag column contains "False," the virtual hard disk file is determined to be out of use. If the state of being in use is determined, step 2012 is reached; if the state of not being in use is determined, then step 2004 is reached.

(4) The handling determining unit 405 identifies the virtual server 101 that used most recently the virtual hard disk file 107 identified in step 2002 (step 2004). Specifically, a search is made via the configuration managing unit 401 through the virtual hard disk configuration table 412 in reverse chronological order, for any record in the virtual hard disk file column 701 which matches the virtual hard disk file 107 identified in step 2002 and which retains the content identifying the virtual server in the virtual server column 702. If such a record is found, then the content in the virtual server column 702 of that record is acquired.

(5) The handling determining unit 405 identifies the guest OS 103 operating on the virtual server 101 identified in step 2004 (step 2005). Specifically, a search is made via the configuration managing unit 401 through the virtual server column 1001 in the virtual server OS correspondence table 401, so as to acquire the content in the host name column 1002 of the record that matches the virtual server 101 identified in the step 2004.

(6) The handling determining unit 405 acquires the file system 105 corresponding to the virtual hard disk file 107 (step 2006). The detailed process of step 2006 was discussed above in conjunction with the explanation of FIG. 17.

(7) The handling determining unit 405 acquires the time at which the virtual hard disk file 107 was used most recently (step 2007). Specifically, the time at which the record in the virtual hard disk configuration table 412 identified in step 2003 was registered is acquired via the configuration managing unit 401.

(8) The handling determining unit 405 acquires the used volume size (X), in effect at the time identified in step 2006, of the file system 105 identified in step 2005 (step 2008). Specifically, a search is made via the performance managing unit 402 for the record of which the OS column 502 in the file system volume table 413 contains the host name identified in step 2004, of which the file system column 503 contains the file system 105 identified in step 2005, and of which the time column 501 contains the time identified in step 2006. The content in the used volume size column 505 of the detected record is then acquired.

(9) The handling determining unit 405 acquires the file size (Y) of the current virtual hard disk file 107 (step 2009). Specifically, a search is made via the performance managing unit 402 through the virtual hard disk file size column 408 so as to acquire the size column 603 of the record of which the time column 601 contains the present time (or the time closest to the present time) and of which the virtual hard disk file column 602 contains the virtual hard disk file 107 identified in step 2002.

(10) The handling determining unit 405 calculates the difference between the file size (X) acquired in step 2008 and the used volume size (Y) acquired in step 2009, and takes the calculated difference as the optimized size (Y-X) of the virtual hard disk file 107 identified in step 2002 (step 2010).

(11) The handling determining unit 405 returns the optimized size calculated in step 2010 (step 2011), and terminates the processing.

(12) The handling determining unit 405 identifies the virtual server 101 that uses the virtual hard disk file 107 identified in step 2002 (step 2012). Specifically, a search is made via the configuration managing unit 401 through the virtual hard disk configuration table 412 so as to acquire the content in the virtual server column 702 of the record of which the virtual hard disk file column 701 contains the virtual hard disk file 107 identified in step 2002.

(13) The handling determining unit 405 identifies the guest OS 103 operating on the virtual server 101 identified in step 2012 (step 2013). Specifically, a search is made via the configuration managing unit 120 through the virtual server OS correspondence table 414 so as to acquire the content in the host name column 1002 of the record of which the virtual server column 1001 contains the matching virtual server 101 identified in step 2012.

(14) The handling determining unit 405 acquires the file system 105 corresponding to the virtual hard disk file 107 identified in step 2001 (step 2014). Specifically, a search is made via the configuration managing unit 401 through the virtual hard disk file system correspondence table 415 for the record of which the virtual hard disk file column 901 matches the virtual hard disk file 107 identified in step 2001. The content in the file system column 901 of the matching record is then acquired. The virtual hard disk file system table 415 is generated by the processing operations discussed above using FIG. 17.

(15) The handling determining unit 405 acquires the used volume size (X), in effect at the present time, of the file system 105 identified in step 2014 (step 2015). Specifically, a search is made via the performance managing unit 402 through the file system volume table 413 for the record of which the time column 501 contains the present time, of which the OS column 502 contains the host name identified in step 2013, and of which the file system column 503 contains the file system 105 identified in step 2014. When the content in the used volume size column 505 of the matching record is acquired, step 2008 is reached.

Figure 21:
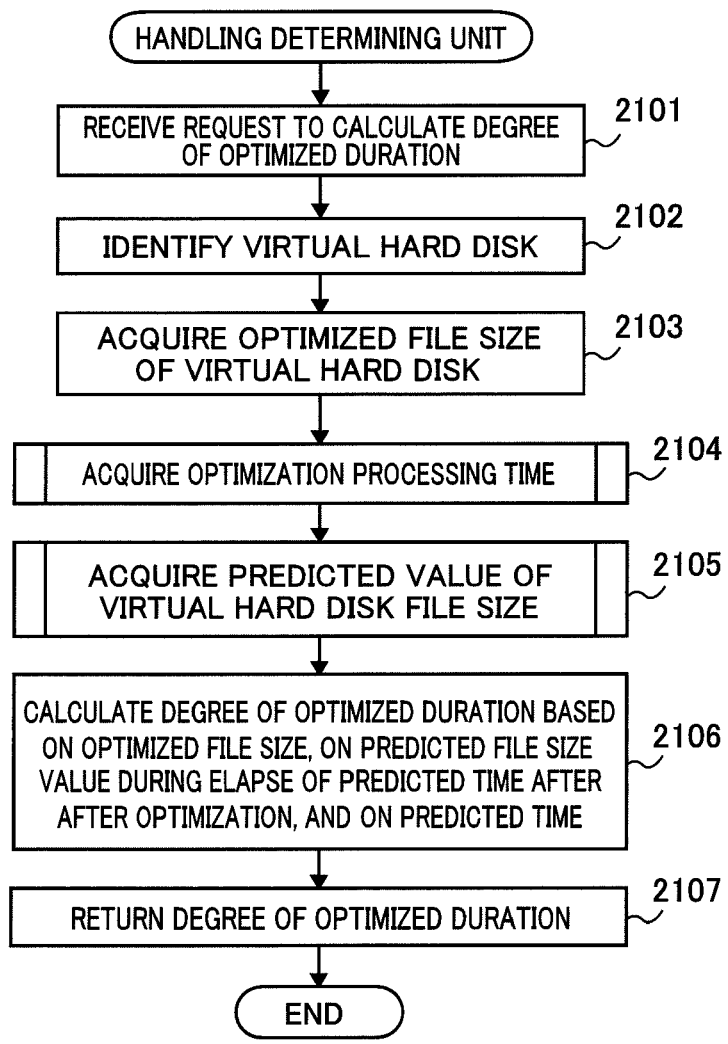
FIG. 21 is a flowchart showing processing operations performed by the handling determining unit for calculating the degree of duration of the optimized size of a virtual hard disk file 107.

FIG. 21 is a flowchart showing the processing operations performed by the handling determining unit 405 for calculating the degree of duration of the optimized size of a virtual hard disk file 107.

(1) The handling determining unit 405 receives a request to calculate the degree of duration of an optimized size (step 2101).

(2) From the request received in step 2102, the handling determining unit 405 identifies the virtual hard disk file 107 targeted for the calculation (step 2102).

(3) The handling determining unit 405 calculates the optimized file size of the virtual hard disk file 107 identified in step 2102 (step 2103). Specifically, the used volume size of the file system 105 acquired in steps 2001 through 2008 shown in FIG. 20 is the optimized file size. Alternatively, the optimized file size may be the used volume size, in effect at the present time, of the file system 105 acquired in steps 2001 through 2015.

(4) The handling determining unit 405 acquires the estimated time of the optimization process on the virtual hard disk file 107 identified in step 2102 (step 2104). The specific process was explained above using FIG. 19 and thus will not be discussed further.

(5) The handling determining unit 405 calculates the predicted file size value of the virtual hard disk file 107 identified in step 2102 (step 2105). The specific process was explained above using FIGS. 18A and 18B and thus will not be discussed further.

(6) The handling determining unit 405 calculates the degree of optimized duration based on the optimized file size acquired in step 2103, on the predicted file size value acquired in step 2105, and on the predicted time (step 2106). Any calculation method may be used as long as it permits calculation of an indicator indicative of an optimized size being retained as the degree of optimized size duration. For example, the degree of optimized size duration may be the integral of the file sizes of the virtual hard disk file 107 from the time the optimization process is completed (or started) until a predetermined time period has elapsed. Alternatively, the value of the integral may be divided by the file size of the virtual hard disk file 107 in effect upon completion of the optimization process (or at the start thereof or upon elapse of a predetermined time period). As another alternative, the degree of optimized size duration may be given as the difference between the file size of the virtual hard disk file 107 in effect upon completion of the optimization process (or at the start thereof) on the one hand, and the file size of the virtual hard disk file 107 in effect upon elapse of a predetermined time period on the other hand. As a further alternative, the degree of optimized size duration may be given by dividing the difference above by the predetermined time period. As an even further alternative, the degree of optimized size duration may be given when the difference above or the quotient obtained by dividing the difference by the time period is further divided by the file size in effect upon completion of the optimization process (or at the immediately preceding time or upon elapse of a predetermined time period).

(7) The handling determining unit 405 returns the degree of optimized size duration calculated in step 2106 (step 2107).

Figure 22A:
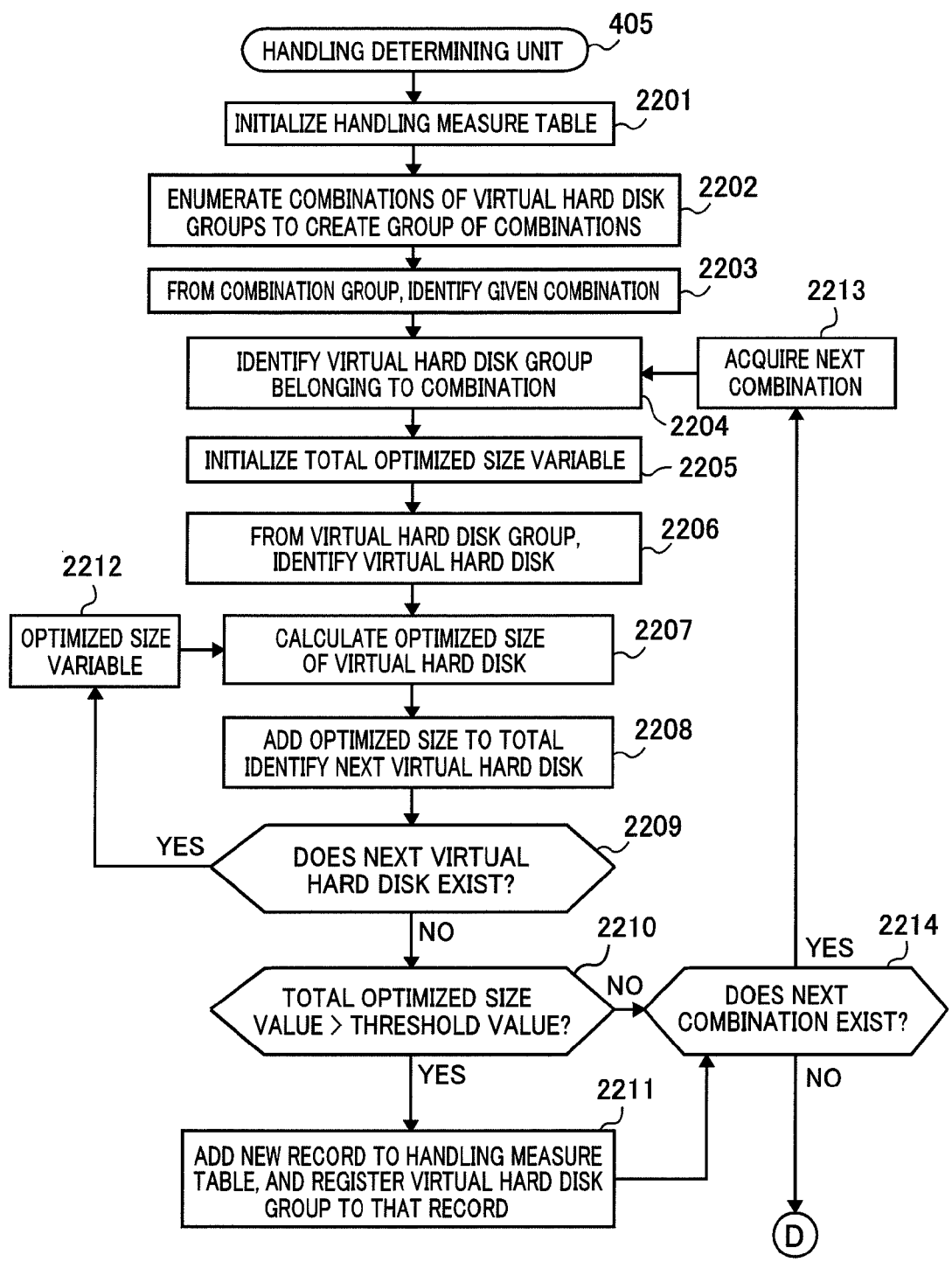
FIG. 22A is a flowchart showing processing operations performed by the handling determining unit for determining handling measures.
Figure 22B:
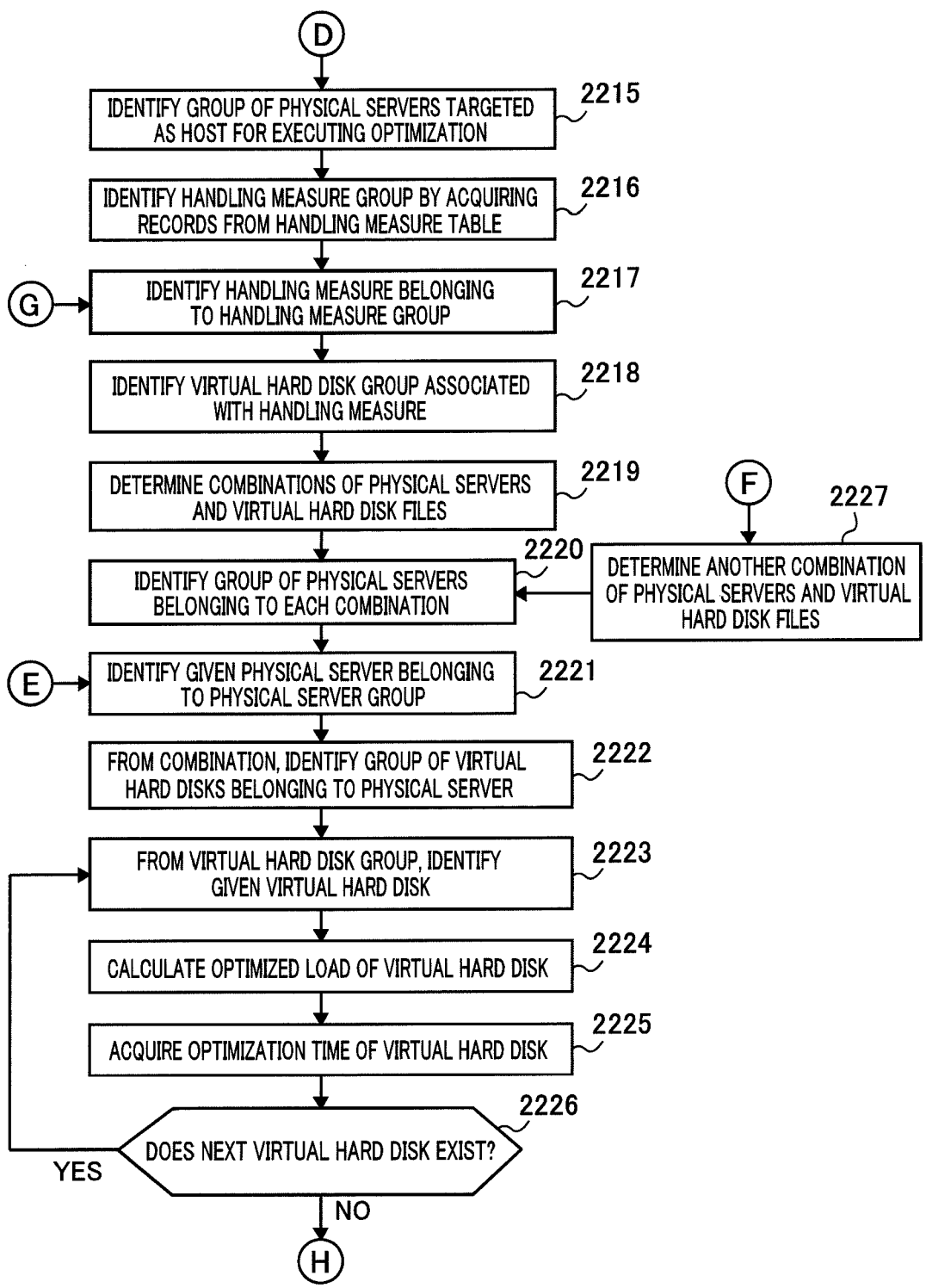
FIG. 22B is a flowchart showing processing operations performed by the handling determining unit for determining the handling measures.
Figure 22C:
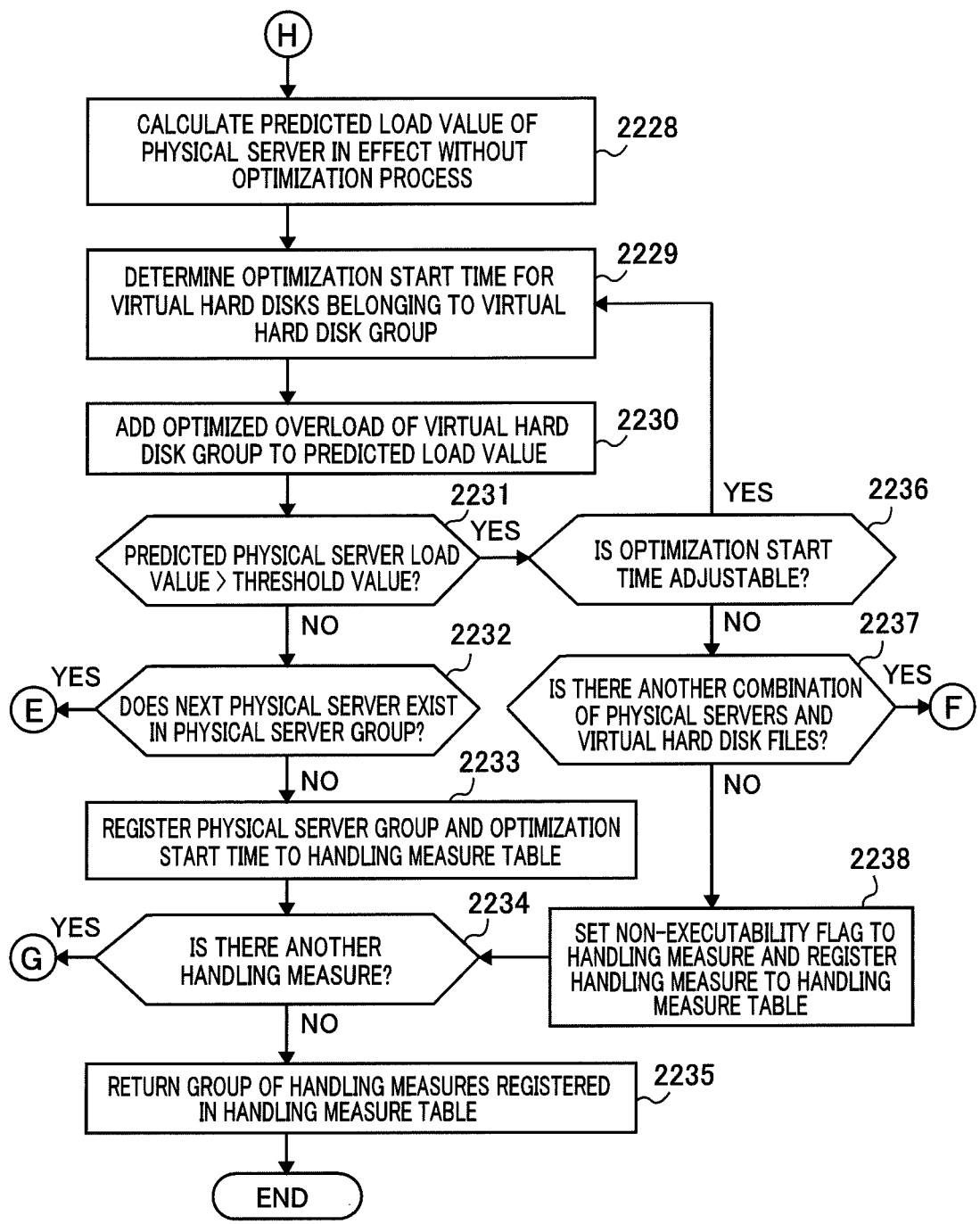
FIG. 22C is a flowchart showing processing operations performed by the handling determining unit for determining the handling measures.

FIGS. 22A, 22B and 22C are flowcharts showing the processing operations performed by the handling determining unit 405 for determining handling measures. First, the processing operations carried out in steps 2201 through 2214 enumerate in the handling measure table 416 handling measure candidates for resolving an incident with an optimized size.

(1) Upon receipt of a request for handling measures, the handling determining unit 405 initializes the handling measure table 416 (step 2201).

(2) The handling determining unit 405 enumerates combinations of virtual hard disk files 107 to create a group of virtual hard disk file combinations (step 2202).

(3) From the combination group created in step 2202, the handling determining unit 405 identifies a particular combination (step 2203).

(4) The handling determining unit 405 identifies a group of virtual hard disk files belonging to the combination identified in step 2203 or in step 2213, to be discussed later (step 2204).

(5) The handling determining unit 405 initializes a total optimized size variable (step 2205). The total optimized size variable here is a variable that stores the free volume size of the file system 108 or file system 113 that can be secured by optimizing the entire virtual hard disk group. What the free volume size is written to is not limited to the variable; any other suitable form may be used as long as it can accommodate the free volume size.

(6) From the virtual hard disk file group, the handling determining unit 405 identifies a given virtual hard disk file 107 (step 2206).

(7) The handling determining unit 405 calculates the optimized size of the virtual hard disk file 107 identified in step 2206 or in step 2212, to be discussed later (step 2207). How to calculate the optimized size was explained above using FIG. 20 and thus will not be discussed further.

(8) The handling determining unit 405 adds the optimized size calculated in step 2207 to the total optimized size variable (step 2208).

(9) The handling determining unit 405 determines whether there exists in the virtual hard disk file group identified in step 2206 any virtual hard disk file 107 yet to be identified in step 2206 or in step 2212 (step 2209). If any such virtual hard disk file is determined to exist, step 2212 is reached; if not, step 2210 is reached.

(10) The handling determining unit 405 determines whether the value of the total optimized size variable is larger than a threshold value (step 2210). Specifically, a search is made through the incident column 1701 in the incident table 417 using as the key the incident ID of the incident of which the status was changed to that of handling being executed in step 1602 of FIG. 16, so as to acquire the content in the event ID column 1706 of the matching record. Then a search is made through the event table 418 using the content of the event ID column as the key, so as to acquire the content in the threshold value ID column 2402 of the matching record. Further, a search is made through the threshold value ID column 1101 in the threshold value table 411 using the content of the threshold value column 2402 as the key, so as to acquire the condition column 1103 of the matching record. Here, it is determined whether or not the acquired condition is satisfied. For example, it is determined whether or not the condition is satisfied by the used volume size of the file system 108 or file system 113 reduced by the total variable value. If the total optimized size is determined to be larger than the reduced size, step 2211 is reached. If the total optimized size is determined to be equal to or smaller than the reduced size, step 2214 is reached. In step 2210, it is determined whether or not the incident is resolved by releasing the used volume size of the file system 108 or file system 113 by a target value when all virtual hard disk files belonging to the virtual hard disk file group of interest have been optimized. The above-mentioned threshold value may be regarded as a reduction target size by which to reduce the virtual hard disk files. It only needs to be determined whether or not to optimize the virtual hard disk files selected for the optimization so that their total size becomes larger than the reduction target size.

(11) The handling determining unit 405 adds a new record to the handling measure table 416, attaches the same identifier anew to the handling measure ID 1301 of the newly added record, writes to the virtual hard disk column 1302 of this record the information identifying the virtual hard disk file 107 belonging to the virtual hard disk file group identified in step 2204 (step 2211), and goes to step 2214.

(12) The handling determining unit 405 identifies the next virtual hard disk file yet to be identified (step 2212) from the virtual hard disk file group identified in step 2204, and goes to step 2207.

(13) The handling determining unit 405 identifies the next combination yet to be identified from the combination group identified in step 2202 (step 2213), and goes to step 2204.

(14) The handling determining unit 405 determines whether there exists any combination yet to be identified in step 2203 or in step 2213 in the combination group identified in step 2202 (step 2214). If any such combination is determined to exist, step 2213 is reached; if not, step 2215 is reached.

Next, with regard to the enumerated handling measures, the physical server 100 for optimizing virtual hard disk files 107 and the execution start time of the optimization are determined by the processing operations to be carried out in steps 2215 through 2236.

(15) The handling determining unit 405 identifies the group of candidate physical servers for performing the optimization (step 2215).

(16) The handling determining unit 405 identifies the group of handling measures from the handling measure table 416 (step 2216).

(17) The handling determining unit 405 identifies a given handling measure belonging to the handling measure group (step 2217). Specifically, a group of records of which the handling measure ID column 1301 is the same in the handling measure table 416 is identified as the handling measure.

(18) The handling determining unit 405 identifies the group of virtual hard disk files associated with the handling measure (step 2218). Specifically, the contents in the virtual hard disk column 1302 of the records belonging to the record group identified in step 2217 or in step 2228, to be discussed later, are acquired and identified as the group of virtual hard disk files.

(19) The handling determining unit 405 determines the combinations of the physical servers 100 belonging to the physical server group identified in step 2215 and of the group of virtual hard disk files identified in step 2218 (step 2219). Different virtual hard disk files 107 may be combined with the same physical server 100. Every virtual hard disk file 107 needs to be combined with a certain physical server 100, but it is not mandatory for every physical server 100 to be combined with a virtual hard disk file 107.

(20) From each combination in the combination group identified in step 2219, the handling determining unit 405 extracts information identifying each physical server and identifies the group of physical servers (step 2220).

(21) The handling determining unit 405 identifies a physical server 100 from the physical server group identified in step 2220 (step 2221).

(22) From the combination identified in step 2219, the handling determining unit 405 identifies the virtual hard disk file group combined with the physical server 100 identified in step 2220 (step 2222).

(23) The handling determining unit 405 identifies a virtual hard disk file 107 from the virtual hard disk file group identified in step 2222 (step 2223).

(24) The handling determining unit 405 calculates the optimized load of the virtual hard disk file 1017 identified in step 2222 (step 2224). Here, the optimized load refers to the loads incurred on the physical server in connection with the optimization process, such as the CPU load, memory load, network bandwidth usage amount, and disk bandwidth usage amount. The optimized overload is calculated through estimation by acquiring from the performance managing unit 402 the loads incurred in the past optimization processes. Alternatively, the optimized load may be linearly predicted according to the optimized size, the file size of the virtual hard disk file 107, or the optimization time.

(25) The handling determining unit 405 calculates the optimization time of the virtual hard disk file 107 identified in step 2223 (step 2225). How to calculate the optimization time was explained above using FIG. 19 and thus will not be discussed further.

(26) The handling determining unit 405 determines whether there exists any virtual hard disk file 107 yet to be identified in step 2223 in the virtual hard disk file group identified in step 2222 (step 2226). If any such virtual hard disk file is determined to exist, step 2223 is reached; if not, step 2229 is reached.

(27) The handling determining unit 405 determines another combination of physical servers 100 and virtual hard disk files 107 (step 2227), and goes to step 2220.

(28) The handling determining unit 405 predicts the load on the physical server 100 identified in step 2221 where none of the virtual hard disk files 107 is subjected to the optimization process (step 2228). The load in the future is predicted via the performance information managing unit 402 acquiring the loads of the physical server 100 in the past.

(29) The handling determining unit 405 determines the optimization start time for all virtual hard disks belonging to the virtual hard disk file group identified in step 2222 (step 2229). Any time in the future is acceptable.

(30) The handling determining unit 405 adds the load calculated in step 2224 to the load of the physical server 100 calculated in step 2228 (step 2230). Specifically, the load calculated in step 2224 solely during the optimization time calculated in step 2225 starting from the optimization start time calculated in step 2229 is added to the load of all virtual hard disk files belonging to the virtual hard disk file group identified in step 2222. The load calculated in step 2230 is the load predicted for the physical server 100 upon execution of the optimization process.

(31) The handling determining unit 405 determines whether the load calculated in step 3330 exceeds a threshold value (step 2231). Specifically, a search is first made through the incident column 1701 in the incident table 417 using as the key the incident ID of the incident of which the status was set to "handling being executed" in step 1602 of FIG. 16, so as to acquire the content in the event ID column 1706 of the matching record. Then using the content of the event ID column 1706 as the key, a search is made through the event table 418 to acquire the content in the threshold value column 2402 of the matching record. Further, using the content of the threshold value column 2402 as the key, a search is made through the threshold value ID column 1101 in the threshold value table 411 to acquire the condition column 1103 of the matching record. It is determined here whether the acquired condition is satisfied. For example, it is determined whether the load calculated in step 3330 satisfies the condition column 1103. If the load is determined to exceed the threshold value, step 2236 is reached; if not, step 2232 is reached.

(32) The handling determining unit 405 determines whether there exists any physical server 100 yet to be identified in step 2221 in the physical server group identified in step 2220 (step 2232). If any such physical server is determined to exist, step 2221 is reached; if not, step 2223 is reached.

(33) The handling determining unit 405 stores the physical server group and the optimization start time into the handling measure table 416 (step 2233). Specifically, the handling measure ID identified in step 2217 is stored into the handling measure ID column 1301; the record is identified of which the virtual hard disk file column 1302 contains the virtual hard disk file 107 of the combination identified in step 2219; the physical server 100 of this combination is stored into the physical server column 1304 of this record; and the optimization start time determined in step 2229 with regard to this combination is stored into the optimization start time column 1303. Also, "True" is written to the executability flag column 1306 of this record. The process of step 2233 involves determining the handling measure that permits execution of the optimization process without getting the load of the physical server 100 to exceed the threshold value, thereby determining the physical server executing the optimization process on the virtual hard disk files 107 and the optimization start time.

(34) The handling determining unit 405 determines whether there exists any handling measure yet to be identified in step 2217 in the handling measure group identified in step 2216 (step 2234). If any such handling measure is determined to exist, step 2217 is reached; if not, step 2235 is reached.

(35) The handling determining unit 405 returns the handling measure group stored in the handling measure table 416 (step 2235), and terminates the processing.

(36) The handling determining unit 405 determines whether it is possible to adjust the optimization start time for each virtual hard disk file 107 determined in step 2229 (step 2236). If the optimization start time is determined to be adjustable, step 2229 is reached. If the optimization start time is determined not to be adjustable, step 2237 is reached. When the optimization start time is non-adjustable, it means that the handling measure in question is not highly executable because the optimization process, if performed on the current combination of physical servers 100 and virtual hard disk files 107, will cause the load on the physical servers 100 to become excessive.

(37) The handling determining unit 405 determines whether there is any other combination in those identified in step 2219 (step 2237). If any such combination is determined to exist, step 2227 is reached. If no such combination is determined to exist, step 2238 is reached. If no further combination exists, it means that there exist no physical servers for optimizing the virtual hard disk group cited by the handling measure and that the handling measure is not highly executable unless other physical servers are appropriated from somewhere else.

(38) The handling determining unit 405 sets a non-executability flag to the applicable handling measure in the handling measure table 416 (step 2238). Specifically, a search is made through the handling measure ID column 1301 in the handling measure table 416, so as to write "False" to the executability flag column 1306 of the record corresponding to the handling measure identified in step 2217. After step 2238, step 2234 is reached.

Figure 23A:
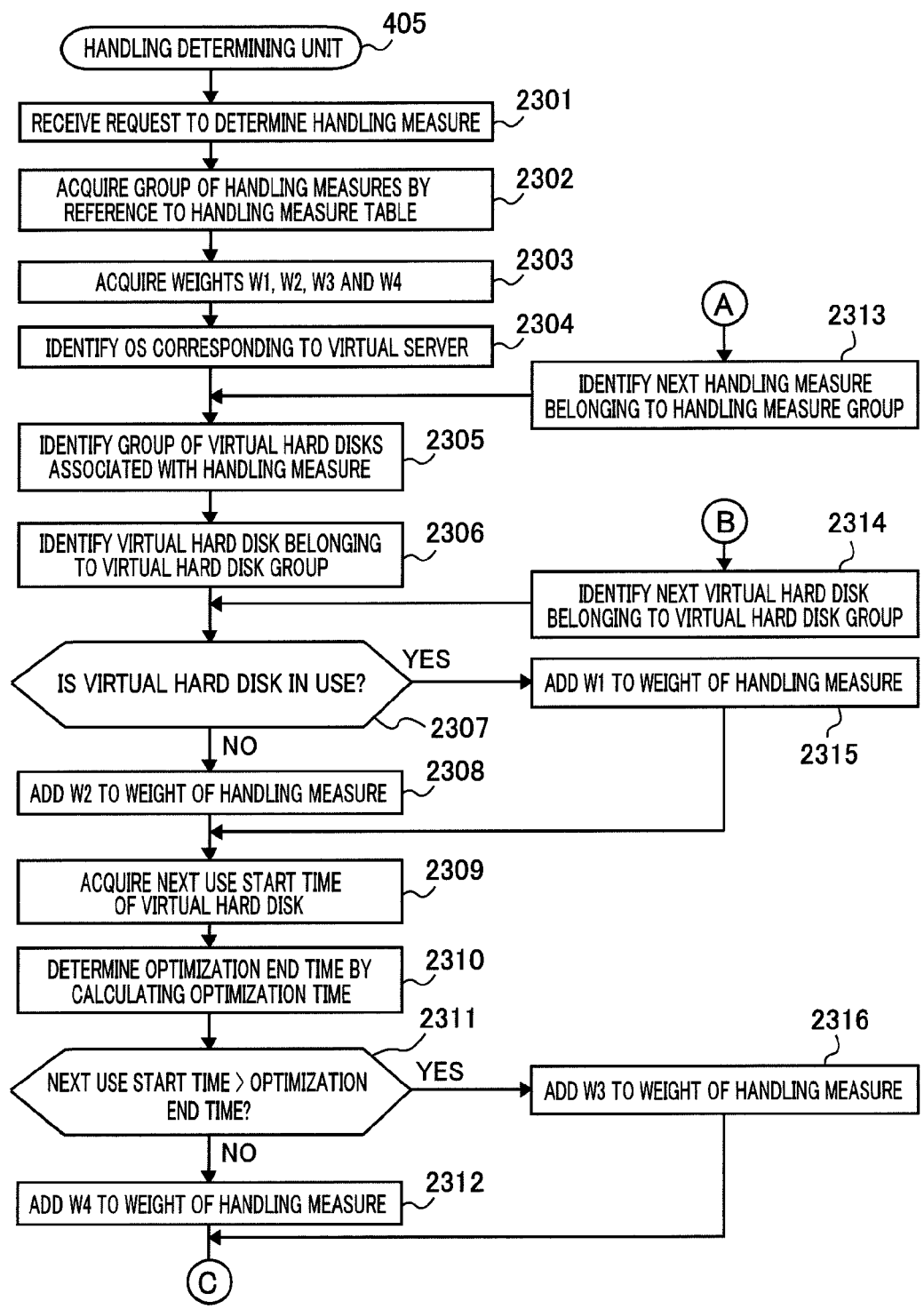
FIG. 23A is a flowchart showing processing operations performed by the handling determining unit for determining a handling measure.
Figures 23B, 24:
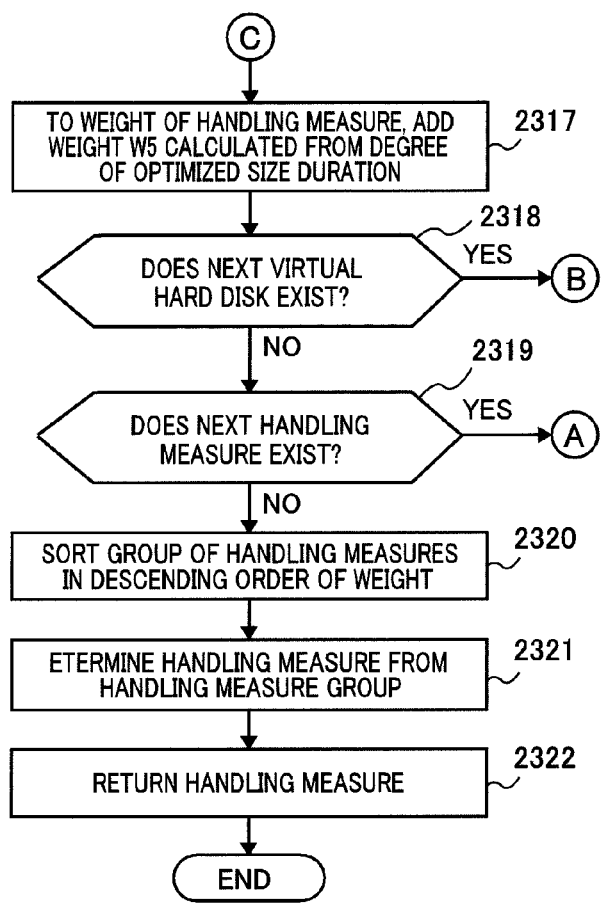
FIG. 23B is a flowchart showing processing operations performed by the handling determining unit for determining the handling measure.
FIG. 24 is a view showing an example of an event table.

FIGS. 23A and 23B are flowcharts showing the processing operations performed by the handling determining unit 405 for determining a handling measure.

(1) The handling determining unit 405 receives a request to determine a handling measure (step 2301).

(2) The handling determining unit 405 identifies the group of handling measures by reference to the handling measure table (step 2302).

(3) The handling determining unit 405 acquires weights W1, W2, W3, W4, and W5 (step 2303). Here, the weights W1, W2, W3, and W4 are those for prioritizing virtual hard disk files 107. The weights W1 and W2 are added depending on whether or not a virtual hard disk file 107 is in use. The weights W3 and W4 are added depending on whether a currently unused virtual hard disk file 107 is likely to be used before the optimization end time. The weight W5 is used depending on the degree of optimized size duration. These weights are established beforehand by the administrator based on a policy of portioning priorities. On the basis of these weights, the handling determining unit 405 can determine an optimum handling measure.

(4) The handling determining unit 405 identifies a handling measure from the handling measure group identified in step 2302 (step 2304).

(5) The handling determining unit 405 identifies the group of virtual hard disk files associated with the handling measure (step 2305).

(6) The handling determining unit 405 identifies a virtual hard disk 107 belonging to the virtual hard disk file group identified in step 2305 (step 2306).

(7) The handling determining unit 405 determines whether the virtual hard disk 107 identified in step 2306 is in use (step 2307). If the virtual hard disk is determined to be in use, step 2315 is reached; if not, step 2308 is reached.

(8) The handling determining unit 405 adds the weight W2 acquired in step 2303 to the handling measure identified in step 2304 (step 2308). Specifically, a search is made for the record of which the content corresponding to the handling measure identified in step 2304 is stored in the handling measure ID column 1301 of the handling measure table 416, and the weight W is added to the weight column 1305 of the matching record.

(9) The handling determining unit 405 acquires the next use start time of the virtual hard disk 107 identified in step 2306 (step 2309). Specifically, the virtual server 101 to which to connect the virtual hard disk file 107 is identified; the next start time of the virtual server 101 is identified from the schedule table 409; and this start time is taken as the next use start time of the virtual hard disk file 107. Alternatively, past history information about the times when the virtual hard disk file 107 was in use may be acquired from the virtual hard disk configuration table 412 via the configuration managing unit 401, and periodicity may be detected from these times so as to predict the next use start time.

(10) The handling determining unit 405 calculates the optimization time of the virtual hard disk file 107 identified in step 2306 and, from the optimization start time associated with the handling measure, calculates the optimization end time (step 2310). How to calculate the optimization time was explained above using FIG. 19 and thus will not be discussed further. Specifically, what is acquired through calculation is first the optimization start time in the optimization start time column 1303 of the record of which the content corresponds to the handling measure identified in step 2304 in the handling measure ID column 1301 of the handling measure table 416 and of which the virtual hard disk file column 1302 contains the virtual hard disk file 107 identified in step 2306. The optimization end time is then calculated by adding the optimization time to the optimization start time.

(11) The handling determining unit 405 determines whether the next use start time acquired in step 2309 is later than the optimization end time calculated in step 2310 (step 2311). If the next use start time is determined to be later than the optimization end time, step 2312 is reached; if the next use start time is determined to be no later than the optimization end time, step 2316 is reached.

(12) The handling determining unit 405 adds the weight W4 acquired in step 2303 to the handling measure identified in step 2304 (step 2312). How to make the addition is the same as in step 2308. After step 2312, step 2317 is reached.

(13) The handling determining unit 405 identifies any handling measure which belongs to the handling measure group identified in step 2302 and which has yet to be identified in step 2304 or in step 2313 (step 2313), and goes to step 2305.

(14) From the virtual hard disk file group identified in step 2305, the handling determining unit 405 identifies any virtual hard disk file 107 yet to be identified in step 2306 or in step 2314 (step 2314), and goes to step 2307.

(15) The weight W1 acquired in step 2303 is added to the handling measure identified in step 2304 (step 2315). How to make the addition is the same as in step 2308. After step 2315, step 2309 is reached.

(16) The handling determining unit 405 adds the weight W3 acquired in step 2303 to the handling measure identified in step 2304 (step 2316). How to make the addition is the same as in step 2308. After step 2316, step 2317 is reached.

(17) The handling determining unit 405 calculates the degree of optimized size duration of the virtual hard disk file 107 identified in step 2306, and adds the weight calculated from the degree of optimized size duration and from the weight W5 to the handling measure identified in step 2304 (step 2317).

How to make the addition is the same as in step 2308. How to calculate the degree of optimized size duration was explained above using FIG. 21 and thus will not be discussed further.

(18) The handling determining unit 405 determines whether there exists any virtual hard disk file 107 yet to be identified in step 2306 or in step 2314 in the virtual hard disk file group identified in step 2305 (step 2318). If any such virtual hard disk file is determined to exist, step 2314 is reached. If no such virtual hard disk file is determined to exist, step 2319 is reached.

(19) The handling determining unit 405 determines whether there is any handling measure yet to be identified in step 2304 or in step 2313 in the handling measure group identified in step 2302 (step 2319). If the next handling measure is determined to exist, step 2313 is reached. If the next handling measure is determined not to exist, step 2320 is reached.

(20) The handling determining unit 405 sorts the handling measure group (step 2320). Specifically, the records of which the handling measure ID 1301 in the handling measure table 416 is the same are taken as a record group each, and the record groups are sorted in descending order of the values in the weight column 1305 of the record groups. The sorting turns the handling measures of high priorities into high-order records.

(21) The handling determining unit 405 determines the handling measure from the handling measure group (step 2321). Specifically, the highest-order record group sorted in step 2220 is acquired and determined as the handling measure.

(22) The handling determining unit 405 returns the handling measure determined in step 2221 (step 2322), and terminates the processing.

Although this example was shown weighting each handling measure, this is not limitative of this invention. Alternatively, each of the virtual hard disk files 107 may be weighted instead.

Also, although this example was shown managing on the management server 110 the degree of duration of virtual hard disk files 107 and the used volume size (optimized file size) of the file system 105, this is not limitative of this invention. Alternatively, such information may be placed in files that store metadata about the virtual hard disks or embedded in header information about the virtual hard disk files.

According to the above-explained example, it is possible to support the administrator in facilitating the management of the volumes of virtual hard disk files.

Figure 25:
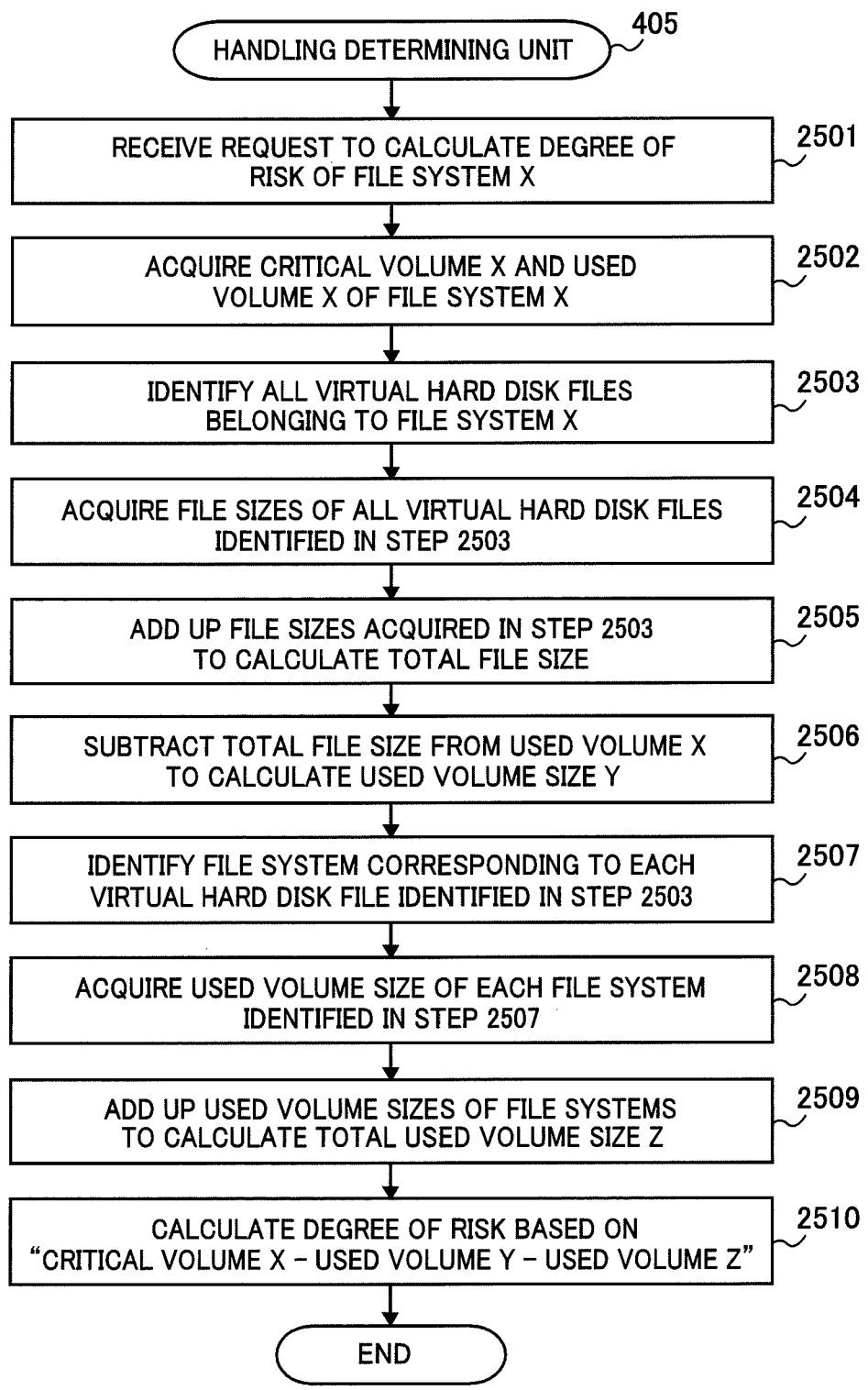
FIG. 25 is a flowchart showing processing performed by the handling determining unit for determining the degree of risk.

FIG. 25 is a flowchart showing the processing performed by the handling determining unit for determining the degree of risk. Here, the degree of risk refers to an evaluation indicator indicative of the possibility that a situation may arise where the free volume of the file system 108 or file system 113 becomes insufficient. This is an indicator for evaluating the possibility that the file sizes of the virtual hard disk files 107 of the variable type held in the file system 108 or in the file system 113 are so expanded that their free volumes become insufficient.

(1) The handling determining unit 405 receives a request to calculate the degree of risk of a file system X (step 2501). Here, the file system X refers to the file system 108 in FIG. 1 or the file system 113 in FIG. 2.

(2) The handling determining unit 405 acquires a critical volume X and a used volume X of the file system X (step 2502).

(3) The handling determining unit 405 determines all virtual hard disk files belonging to the file system X (step 2503). All virtual hard disk files 107 on the file system 108 and on the file system 113 are enumerated.

(4) The handling determining unit 405 acquires the file sizes of all virtual hard disk files identified in step 2502 (step 2504). Specifically, the virtual hard disk file size table 408 is read in via the performance managing unit 402. And a search is made through the virtual hard disk file column 602 using the virtual hard disk file identified in step 2502 as the key, so as to acquire the value in the size column 603 of the matching record. This process is performed on all virtual hard disk files identified in step 2502.

(5) The handling determining unit 405 adds up the file sizes acquired in step 2503 to calculate the total file size (step 2505).

(6) The handling determining unit 405 subtracts the total file size from the used volume X to calculate a used volume size Y (step 2506). The used volume size Y refers to that part of the used volume size of the file system X which is used by the files other than the virtual hard disk files.

(7) The handling determining unit 405 identifies the file system corresponding to each virtual hard disk file identified in step 2503 (step 2507). The virtual hard disk 106 corresponding to each of the virtual hard disk files 107 is identified so as to identify the file system 105 built on the identified virtual hard disk 106.

(8) The handling determining unit 405 acquires the used volume size of each file system identified in step 2507 (step 2508). The used volume of the file system 105 is acquired. Specifically, the file system volume table 413 is read in via the performance managing unit 402. And a search is made through the file system 503 using the file system identified in step 2507 as the key, so as to acquire the value in the used volume size column 505 of the matching record. This process is performed on all file systems identified in step 2507.

(9) The handling determining unit 405 adds up the used volume sizes of the file systems in order to calculate a total used volume size Z (step 2509). The total used volume size Z calculated here

(10) The handling determining unit 405 calculates the degree of risk based on the value of "critical volume X−used volume Y−total used volume size Z" (step 2510). The degree of risk calculated here may be used to evaluate the possibility that a situation may arise where the virtual hard disk files are so expanded that the free volume of the file system X becomes insufficient. The administrator may be readily notified of a risky situation that may arise by a warning message displayed on a monitor screen if the degree of risk is found lower than a predetermined threshold value upon comparison therebetween.

Alternatively, where the degree of risk is to be calculated, the value of "critical volume X−used volume Y−total used volume size Z" may be output and evaluated chronologically. This allows the administrator to predict whether there will be the situation in the future where the free volume of the file system X becomes insufficient.

Other than the degree of risk, the ratio of the used amount of resources to the allocated amount thereof may be calculated as an evaluation indicator by acquiring the value of "total used volume size Z/total file size." This provides an overview of the situation of resource usage and makes it possible to determine whether the optimization process is effective as the handling measure.

Also, the ratio of the used volume of the file system to the file size thereof may be calculated with regard to each virtual hard disk file. This makes it possible to optimize as a handling measure the virtual hard disk files starting from the one with the lowest used volume-to-file size ratio as the indicator.

Figure 26:
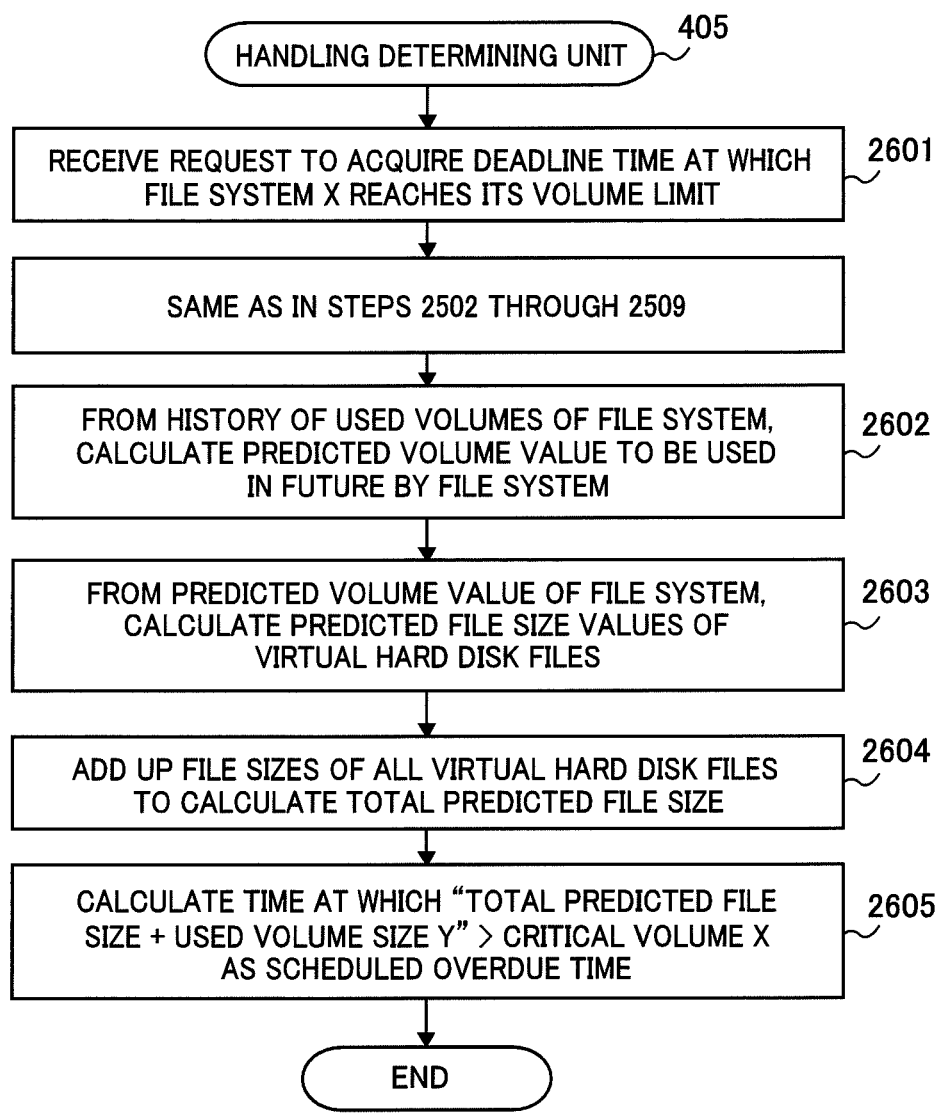
FIG. 26 is a flowchart showing processing performed by the handling determining unit for estimating the deadline time at which a file system will reach its volume limit.

FIG. 26 is a flowchart showing the processing performed by the handling determining unit 405 for estimating the deadline time at which a file system X will reach its volume limit.

(1) The handling determining unit 405 receives a request to acquire the deadline time at which the file system X reaches its volume limit (step 2601). The file system X refers to the file system 108 shown in FIG. 1 or the file system 113 in FIG. 2. After step 2601, the same processes as those in steps 2502 through 2509 are performed, and step 2602 to be explained below is carried out.

(2) From the history of the used volumes of the file system, the handling determining unit 405 calculates the predicted volume value to be used by the file system in the future (step 2602). The file system in step 2602 is the file system 105. The file system volume table 413 is read in via the performance managing unit 402, and a search is made through the file system column 503 using the file system 105 as the key so as to acquire the values in the time column 501 and used volume size column 505 of the matching record. Then the values in the used volume size column 505 are analyzed chronologically based on the values in the time column 501 in order to calculate the volume size to be used by the file system 105 in the future.

(3) The handling determining unit 405 calculates the predicted file size values of virtual hard disk files based on the predicted used volume value of the file system (step 2603). The process of step 2603 is performed on all virtual hard disk files. The calculation is performed in the same way as in steps 1801 through 1808 shown in FIGS. 18A and 18B.

(4) The handling determining unit 405 calculates the total predicted file size by adding up the predicted file size values of all virtual hard disk files (step 2604).

(5) The handling determining unit 405 calculates the time at which the value of "total predicted file size+used volume size Y" becomes larger than the critical volume X as the scheduled overdue time (step 2605). When the processing shown in FIG. 26 is carried out to calculate the scheduled overdue time, the administrator may be presented with the time by which an insufficient volume state will be incurred on each file system 108 or file system 113. On the basis of the presented times, the administrator can determine the need to take handling measures and the urgency of taking such measures, before selecting effective handling measures.

In predicting the file sizes of virtual hard disk files 107, it is possible to take into consideration the fact that the file system 105 cannot be used beyond its total volume. Specifically, the total volume is acquired from the total volume size column 604 of the file system volume table 413, and the prediction is made in step 2602 in such a manner that the acquired total volume will not be exceeded by the predicted volume size to be used by the file system 105.

Also, in predicting the file sizes of virtual hard disk files 107, it is possible to take into consideration the fact that the virtual hard disk files 107 are not expanded beyond their maximum size. Specifically, the maximum size is acquired from the maximum size column 604 of the virtual hard disk file size table 408, and the prediction is made in step 2603 in such a manner that the acquired maximum size will not be exceeded by the predicted file sizes of the virtual hard disk files.

In the processing shown in FIG. 26 and explained above, the predicted file size value of each virtual hard disk file 107 is calculated before the calculation of the predicted volume value to be used by the file system 108. This makes it possible to calculate the predicted values more accurately by taking into account the disk types of individual virtual hard disk files 107, their maximum sizes, and use status of the file system 105, than solely on the basis of the history of the used volumes of the file system 108.

Example 2

This example is configured in such a manner that the used volume size of the file system 105 corresponding to a virtual hard disk file 107 is written to the additional information area of that virtual hard disk file. The management server manages the virtual hard disk files 107 by reference to the used volume sizes stored in these additional information areas and to the virtual hard disk file sizes.

The system configuration is the same as that in FIGS. 1, 2 and 4 and thus will not be discussed further. This example further has the virtual hard disk files 107 provided with an additional information area each. The additional information area may be configured either as an independent file associated with each virtual hard disk file 107 on the file system 108, or as an internal area within the virtual hard disk file 107. Specifically, the additional information area may be accommodated in a configuration file of a virtual server, in a virtual hard disk file, or in an OVF file.

Figure 27:
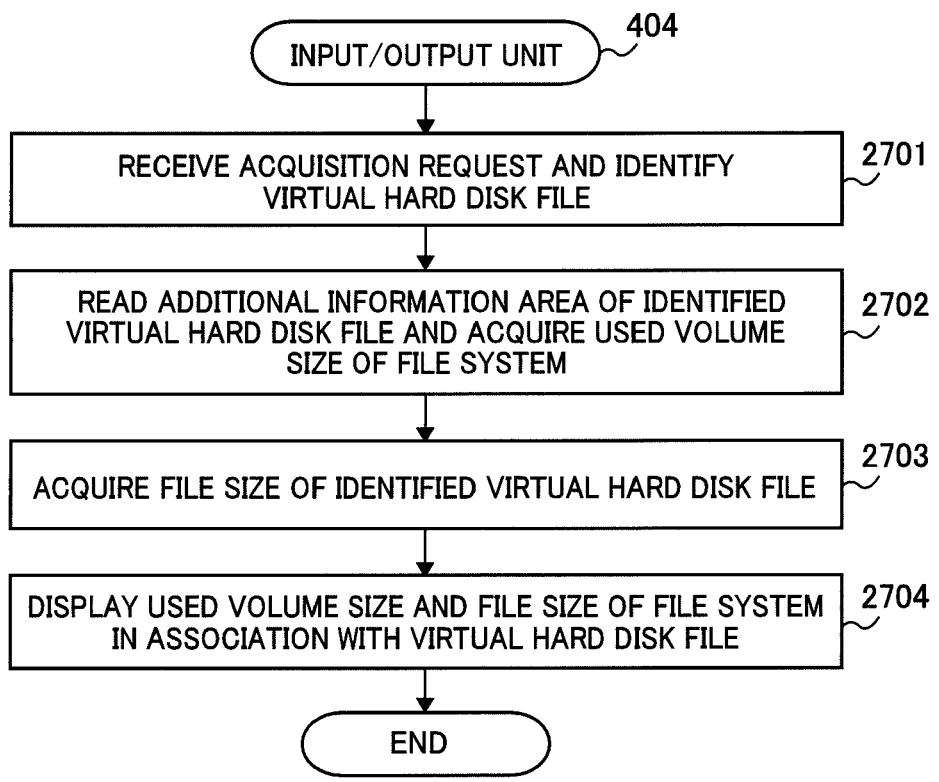
FIG. 27 is a flowchart showing processing performed by an input/output unit for reading the used volume size of a file system from additional information of a virtual hard disk file.

FIG. 27 is a flowchart showing the processing performed by the input/output unit 404 for reading the used volume size of a file system from the additional information of a virtual hard disk file.

(1) The input/output unit 404 receives a display request and identifies a virtual hard disk file (step 2701).

(2) The input/output unit 404 reads the additional information area of the identified virtual hard disk file to acquire the used volume size of the file system (step 2072).

(3) The input/output unit 404 acquires the file size of the identified virtual hard disk file (step 2703).

(4) The input/output unit 404 displays the used volume size and file size of the file system in association with the virtual hard disk file (step 2704).

Figure 28:
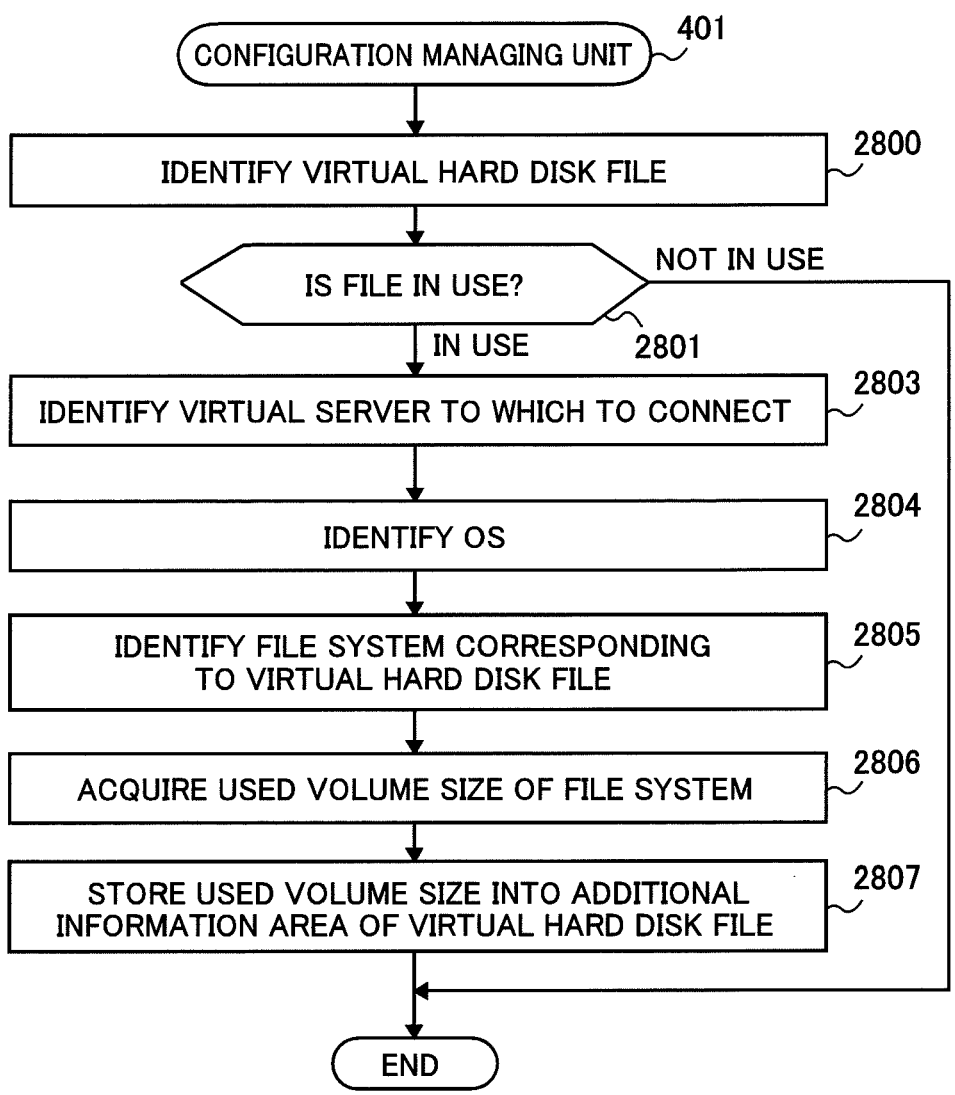
FIG. 28 is a flowchart showing processing performed by the configuration managing unit for storing the used volume size of a file system into the additional information of a virtual hard disk file.

FIG. 28 is a flowchart showing the processing performed by the configuration managing unit 401 for storing the used volume size of a file system into the additional information of a virtual hard disk file.

(1) The configuration managing unit 401 identifies a virtual hard disk file (step 2800).

(2) The configuration managing unit 401 determines whether the virtual hard disk file identified in step 2800 is being used by a virtual server (step 2801). Specifically, the virtual hard disk configuration table 412 is read in, and a search is made through the virtual hard disk file column 701 using the identified virtual hard disk file as the key so as to acquire the in-use column 705 of the matching record. If the entry "False" is acquired, the file is determined to be out of use; if the entry "True" is acquired, the file is determined to be in use.

(3) The configuration managing unit 401 identifies the virtual server 101 to which to connect (step 2802). Specifically, the virtual server column 702 is acquired whose record was found matching the search made through the virtual hard disk file column 701 in step 2801, whereby the virtual server 101 is identified.

(4) The configuration managing unit 401 identifies the guest OS 103 operating on the virtual server 101 (step 2804). Specifically, the virtual server OS correspondence table 414 is read in; a search is made through the virtual server column 1001 using the identified virtual server 101 as the key; and the guest OS 103 is identified from the host name column 1002 of the matching record.

(5) The configuration managing unit 401 identifies the file system 105 corresponding to the virtual hard disk file 107

(step 2805). Specifically, the virtual hard disk file system correspondence table 415 is read in; a search is made through the virtual hard disk file column 901 using the identified virtual hard disk file 107 as the key; and the file system 105 is identified from the file system column 902 of the matching record.

(6) The configuration managing unit 401 acquires the used volume size of the file system 107 (step 2806). Specifically, the file system volume table 413 is read through the performance information managing unit 402; a search is made through the file system column 503 using the file system 107 as the key; and the value in the used volume size column 505 of the matching record is acquired.

(7) The configuration managing unit 401 stores the used volume size into the additional information area of the virtual hard disk file 107 (step 2807). The used volume size may be stored in conjunction with the value of the time column 501 in the file system volume table 413, so that a history of the used volume sizes may be stored chronologically.

The processes of step 2800 and subsequent steps of this example may be started periodically while the guest OS 103 remains active. This makes it possible to write the latest information about the used volume size of the virtual hard disk file 107 into its additional information area. Also, upon detecting deactivation of the guest OS 103, the configuration managing unit 401 may be arranged to start the processes of step 2800 and subsequent steps. This allows the used volume size in effect immediately before deactivation of the guest OS 103 to be written to the additional information area.

With this example, when a virtual hard disk file is copied, its additional information area is also copied so that the copy-destination virtual hard disk file can make use of the used volume size of the copy-source file. It is also possible to utilize the used volume size without going through the management server. For example, the used volume may also be utilized by the management OS 102, by the server virtualizing program 109, or by some other program.

Figure 29:
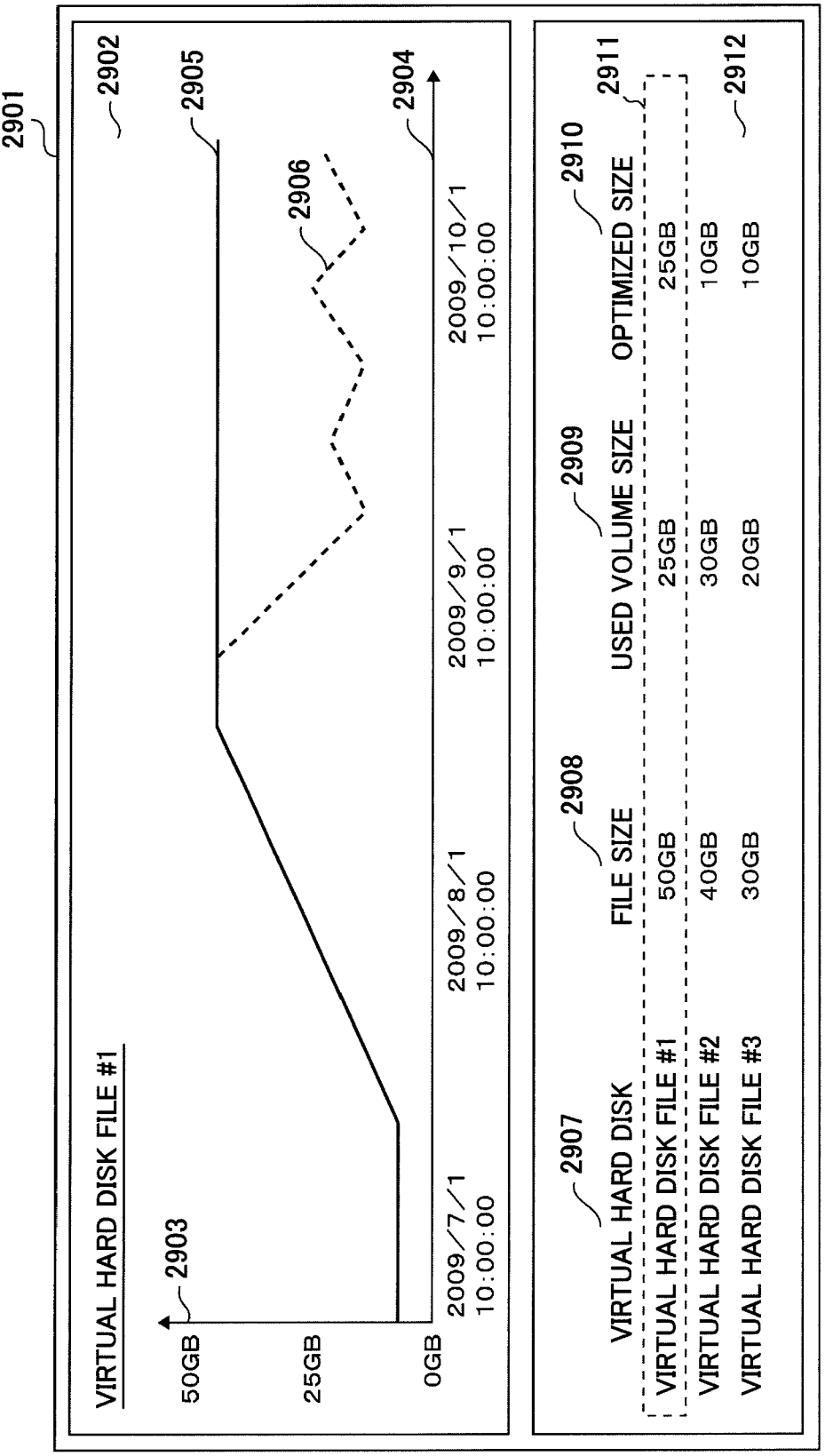
FIG. 29 is an example of a management screen output by the input/output unit.

A management screen common to the examples above is disclosed using FIG. 29.

FIG. 29 is an example of the management screen output by the input/output unit of this invention.

The management screen 2901 includes a graph plotting screen 2902 and a performance listing screen 2912.

Sizes are represented by a vertical axis 2903 and times by a horizontal axis 2904 on the graph screen 2902 that displays a history of file sizes 2905 of a virtual hard disk file 107 and a history of used volume sizes 2906 of the file system 105 related to the virtual hard disk file 107.

The performance listing screen 2912 includes a virtual hard disk column 2907, a file size 2908, a used volume size column 2909, and an optimized size column 2910.

The virtual hard disk column 2907 displays identification information identifying virtual hard disk files 107.

The file size 2908 displays the file sizes of the virtual hard disk files 107.

The used volume size column 2909 displays the used volume sizes of the file systems corresponding to the virtual hard disk files 107. If a plurality of file systems correspond to one virtual hard disk file, the sum of the used volumes of these file systems is displayed in this column.

The optimized size column 2910 displays the file sizes that can be reduced by optimizing the virtual hard disk files 107. Specifically, the values calculated by the processing shown in FIG. 20 are displayed in this column.

A highlighted row 2911 on the performance listing screen 2909 is the currently selected row. The data about the virtual hard disk indicated by the row 2911 is plotted on the graph plotting screen.

Example 3

Figures 30, 31:
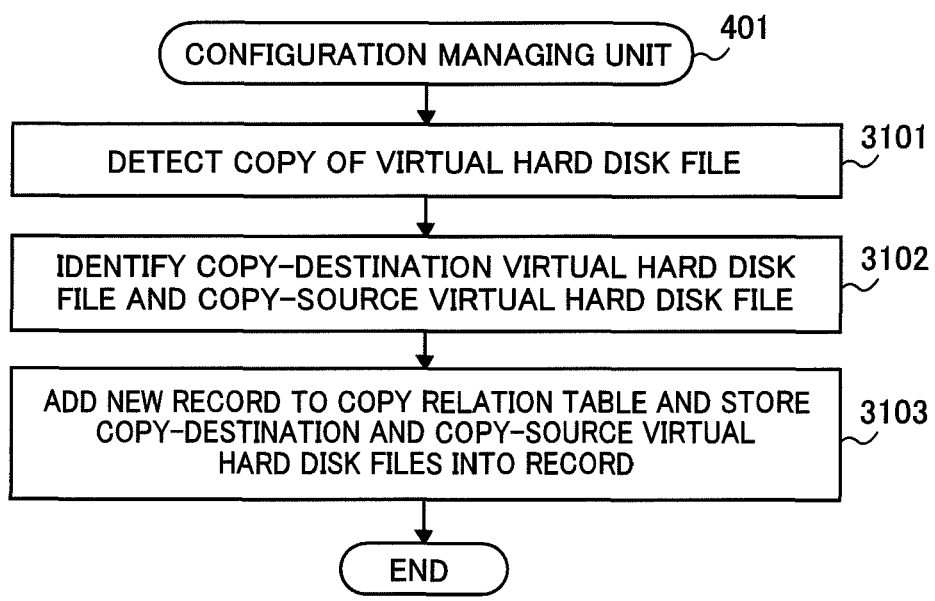
FIG. 30 is a view showing an example of a copy relation table.
FIG. 31 is a flowchart showing processing performed by the configuration managing unit for creating the copy relation table.
Figure 32:
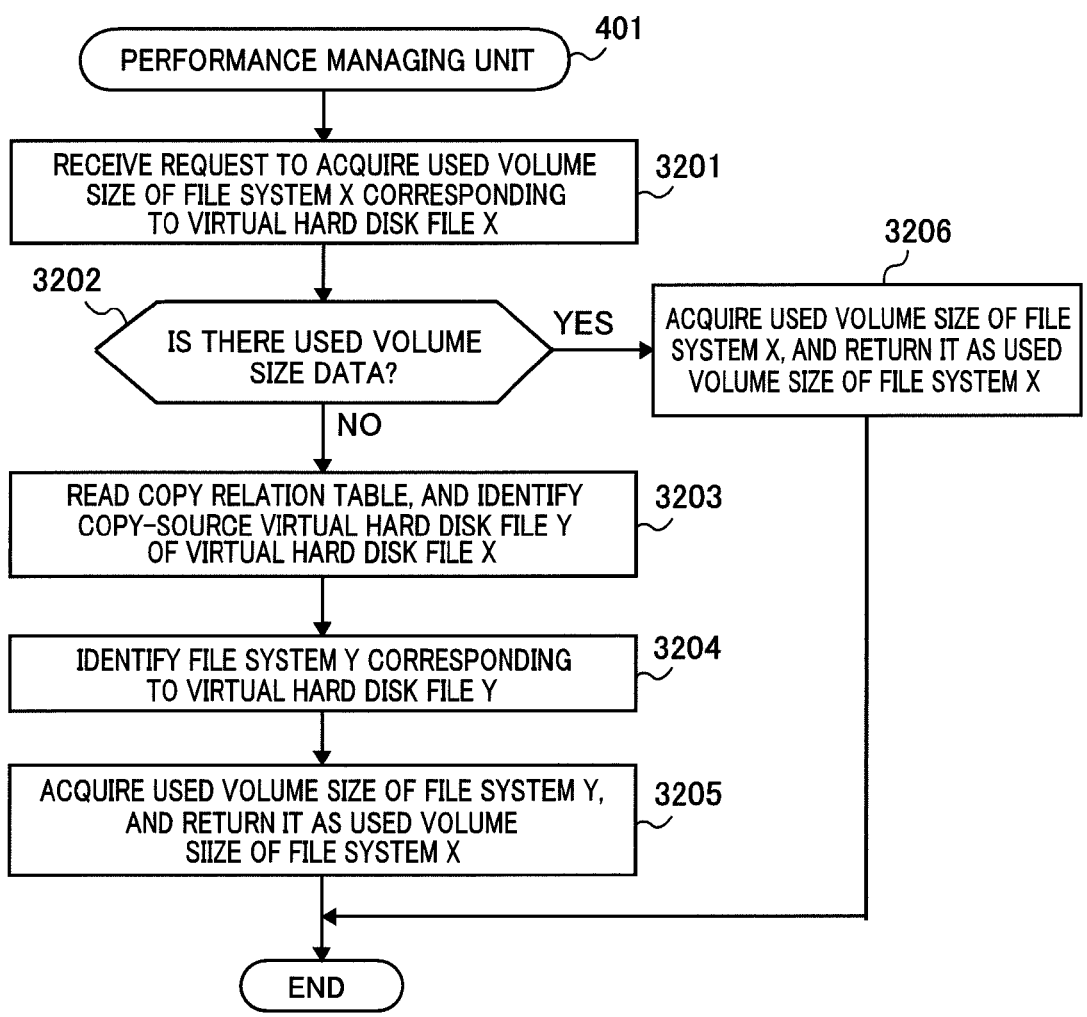
FIG. 32 is a flowchart showing processing performed by a performance managing unit for returning the used volume size of a file system related to a virtual hard disk file.

This example is disclosed using FIGS. 30, 31 and 32.

This example is an example which, when a virtual hard disk file 107 is copied, allows the used volume size of the file system 105 related to the copy-source virtual hard disk file 107 to be utilized by the copy-destination virtual hard disk file 107.

The system configuration is the same as that in FIGS. 1, 2 and 4 and thus will not be discussed further. This example further has a copy relation table 420 (not shown) provided in the storage unit 406 of the management server 110 shown in FIG. 4.

FIG. 30 is a view showing an example of the copy relation table 420. The copy relation table 420 includes a copy-source virtual hard disk file column 3001 and a copy-destination virtual hard disk file column 3002. The copy-source virtual hard disk file column 3001 stores information identifying the virtual hard disk files 107 from which to make copies. The copy-destination virtual hard disk file column 3002 stores information identifying the copied virtual hard disk files 107.

FIG. 31 is a flowchart showing the processing performed by the configuration managing unit 401 for creating the copy relation table 420.

(1) The configuration managing unit 401 detects a copy of a virtual hard disk file (step 3101).

(2) The configuration managing unit 401 stores the copy-source virtual hard disk file 107 and copy-destination virtual hard disk file 107 (step 3102).

(3) The configuration managing unit 401 adds a new record to the copy relation table 420, and writes the copy-destination virtual hard disk file 107 and copy-source virtual hard disk file 107 to the record (step 3103).

FIG. 32 is a flowchart showing the processing performed by the performance managing unit 402 for returning the used volume size of the file system related to a virtual hard disk file 107.

(1) The performance managing unit 402 receives a request to acquire the used volume size of a file system X corresponding to a virtual disk file X (step 3201).

(2) The performance managing unit 402 determines whether there exists used volume size data about the file system X in the file system volume table 413 (step 3202). Specifically, the file system volume table 413 is read in, and a search is made through the file system column 503 for a matching record using the file system X as the key. If no matching record is determined to exist, step 3203 is reached. If the matching record is determined to exist, step 3206 is reached.

(3) The performance managing unit 402 reads the copy relation table 420, and identifies a copy-source virtual hard disk file Y from which the virtual hard disk file X was copied (step 3203). Specifically, the copy relation table 420 is read in; a search is made through the copy-destination virtual hard disk file column 3002 for a matching record using the virtual hard disk file X as the key; and the value in the copy-source virtual hard disk file column 3001 of the matching record is acquired as the virtual hard disk file Y.

(4) The performance managing unit 402 identifies the file system Y corresponding to the virtual hard disk file Y (step 3204). Specifically, the file system Y corresponding to the virtual hard disk file Y is identified via the configuration managing unit 401.

(5) The performance managing unit 402 acquires the used volume size of the file system Y, and returns the acquired size as the used volume size of the file system X (step 3205). Specifically, the file system volume table 413 is read in; a search is made through the file system column 503 for a matching record using the file system Y as the key; and the value in the used volume size column 505 of the matching record is acquired. The used volume size thus acquired is returned as the used volume size of the file system X.

(6) The performance managing unit 402 acquires the used volume size of the file system X and returns the acquired size as the used volume size of the file system X (step 3206). Specifically, the file system volume table 413 is read in; a search is made through the file system column 503 for a matching record using the file system Y as the key; the value in the used volume size column 505 of the matching record is acquired; and the acquired value is returned.

According to this example, when a virtual hard disk file 107 is copied, the performance information of the copy source may be utilized for managing the virtual hard disk file 107. That is, even where the virtual server 101 is not activated using the copy-destination virtual hard disk file 107, the used volume size of the copy source may be used to execute the optimization process. Particularly, when a virtual hard disk file is copied for backup purposes, it is often the case that the virtual server 101 is not activated using the copy-destination virtual hard disk file. Where virtual hard disk files 107 of another generation are copied for backup purposes, the optimized sizes of these virtual hard disk files 107 may be referenced by utilizing the used volume sizes of their copy sources.

In addition to the above-explained examples, it is possible to store the most-recently used times of the virtual hard disks and to display these times on the management screen together with the optimized sizes. Also, by reference to the most-recently used times, the handling determining unit 405 may take the most-recently used hard disks as the candidate hard disks to be optimized preferentially.

REFERENCE SIGNS LIST

100 Physical server
101 Virtual server
102 Management OS
103 Guest OS
104 Interface
105 File system
106 Virtual hard disk
107 Virtual hard disk file
108 File system
109 Server virtualizing program
110 Management server
111 Interface
112 Optimizing unit
113 File system
114 Control terminal
115 Network
117 Performance providing unit
118 Configuration providing unit
119 Performance providing unit
120 Configuration providing unit
122 Storage apparatus
123 Input/output unit
300 Computer
301 CPU
302 Memory controller
303 Main memory
304 Host bus adapter
305 SAN switch
306 Hard disk drive interface
307 Display interface
308 Input interface
309 LAN interface
310 LAN switch
311 Hard disk drive
312 Display apparatus
313 Input device
314 Bus
401 Configuration managing unit
402 Performance managing unit
403 Schedule managing unit
404 Input/output unit
405 Handling determining unit
406 Storage unit
407 File system configuration table
408 Virtual hard disk file size table
409 Schedule table
410 Schedule execution result table
411 Threshold value table
412 Virtual hard disk configuration table
413 File system volume table
414 Virtual server OS correspondence table
415 Virtual hard disk file system correspondence table
416 Handling measure table
417 Incident table
418 Event table
419 Event managing unit

The invention claimed is:

1. A management server comprising:
a physical server virtually including a virtual server with a virtual hard disk, the management server including:
a used volume acquiring unit configured to acquire a used volume of a first file system for use by the virtual server and built on the virtual hard disk file;
a file size acquiring unit configured to acquire a file size of the virtual hard disk file corresponding to the first file system, and
a calculating unit configured to calculate an optimized file size of the virtual hard disk file based on the difference between the used volume and the file size,
wherein the virtual hard disk file is included in a second file system managed by a management Operating System on the physical server, the calculating unit calculating the optimized file size based on a difference between the total file size adding up the file size of the virtual hard disk file and the file size of any other virtual hard disk file, and the total used volume adding up the used volume of the first file system corresponding to the virtual hard disk file and the used volume of a file system corresponding to the other virtual hard disk file.

2. The management server according to claim 1, further comprising an optimization determining unit configured to determine whether or not to optimize the virtual hard disk based on the optimized size.

3. The management server according to claim 2, wherein the optimization determining unit determines the virtual hard disk file from a volume estimated for future use by the first file system based on a used volume history thereof and from the file size based on the optimized size.

4. The management server according to claim 2, wherein, from the used volume of the first file system, from the file size, and from a critical volume of the second file system, the optimization determining unit calculates the degree of risk of the second file system attaining the critical volume.

5. The management server according to claim 2, wherein, from the used volume of the first file system and from the file size, the optimization determining unit estimates the deadline time at which the second file system attains a critical volume thereof.

6. The management server according to claim 2, wherein, from a history of the used volumes of the first file system, the optimization determining unit estimates the time period following the optimization until the virtual hard disk file is expanded by a predetermined size.

7. The management server according to claim 2, wherein, based on the estimated time period up to the expansion and on the optimized size, the optimization determining unit determines whether or not to optimize the virtual hard disk file.

8. The management server according to claim 2, wherein the calculating unit calculates the optimized size based on the used volume of the first file system in effect when the virtual server used the virtual hard disk most recently and on the file size of the virtual hard disk file currently in effect.

9. The management server according to claim 2, wherein the calculating unit includes the first virtual hard disk file and a second virtual hard disk file created from the first virtual hard disk file, the calculating unit calculating the optimized size of the second virtual hard disk based on the used volume of the file system corresponding to the first virtual hard disk file and on the file size of the second virtual hard disk file.

10. The management server according to claim 1, further comprising an optimization determining unit configured to determine, based on a reduction target size of a second file system and on the optimized size of at least the one virtual hard disk file included in the second file system, whether or not to optimize the virtual hard disk in such a manner that the total file size of the virtual hard disk files determined to be optimized becomes larger than the reduction target size.

11. A management method for use with a management server connected to a physical server virtually including a virtual server with a virtual hard disk, the management method comprising:
    causing the management server to acquire a used volume of a first file system for use by the virtual server and built on the virtual hard disk file;
    causing the management server to acquire a file size of the virtual hard disk file corresponding to the first file system, and
    causing the management server to calculate an optimized file size of the virtual hard disk file based on a difference between the used volume and the file size,
    wherein the virtual hard disk file is included in a second file system managed by a management Operating System on the physical server, a calculating unit calculating the optimized file size based on a difference between the total file size adding up the file size of the virtual hard disk file and the file size of any other virtual hard disk file, and the total used volume adding up the used volume of the first file system corresponding to the virtual hard disk file and the used volume of a file system corresponding to the other virtual hard disk file.

12. A management method for use with a management server managing a physical server, a virtual server, and a virtual hard disk file;
    the physical server including a second Operating System managing the virtual server and the virtual hard disk file;
    the virtual server including a first Operating System and a first file system corresponding to the virtual hard disk file, and
    the management server having a used volume of the first file system collected from the first Operating System and a file size of the virtual hard disk file collected from the second Operating System, the management method comprising:
    causing the management server to identify the first file system corresponding to a given virtual hard disk file;
    causing the management server to acquire the used volume of the first file system and the file size of the virtual hard disk file;
    causing the management server to calculate a difference between the used volume and the file size, and
    causing the management server to calculate an optimized file size of the virtual hard disk file based on a difference between the used volume and the file size,
    wherein the virtual hard disk file is included in a second file system managed by a management Operating System on the physical server, a calculating unit calculating the optimized file size based on a difference between the total file size adding up the file size of the virtual hard disk file and the file size of any other virtual hard disk file, and the total used volume adding up the used volume of the first file system corresponding to the virtual hard disk file and the used volume of a file system corresponding to the other virtual hard disk file.

13. A management program residing in a non-transitory computer-readable storage medium for execution on a management server connected to a physical server virtually including a virtual server with a virtual hard disk, the management program comprising the steps of:
    causing the management server to acquire a used volume of a first file system for use by the virtual server and built on the virtual hard disk file;
    causing the management server to acquire a file size of the virtual hard disk file corresponding to the first file system, and
    causing the management server to calculate an optimized file size of the virtual hard disk file based on a difference between the used volume and the file size,
    wherein the virtual hard disk file is included in a second file system managed by a management Operating System on the physical server, a calculating unit calculating the optimized file size based on a difference between the total file size adding up the file size of the virtual hard disk file and the file size of any other virtual hard disk file, and the total used volume adding up the used volume of the first file system corresponding to the virtual hard disk file and the used volume of a file system corresponding to the other virtual hard disk file.

14. A management program residing in a non-transitory computer-readable storage medium for execution on a management server managing a physical server, a virtual server, and a virtual hard disk file;
    the physical server including a second Operating System managing the virtual server and the virtual hard disk file;
    the virtual server including a first Operating System and a first file system corresponding to the virtual hard disk file, and
    the management server having a used volume of the first file system collected from the first Operating System and a file size of the virtual hard disk file collected from the second Operating System, the management program comprising the steps of:
    causing the management server to identify the first file system corresponding to a given virtual hard disk file;
    causing the management server to acquire the used volume of the first file system and the file size of the virtual hard disk file;

causing the management server to calculate a difference between the used volume and the file size, and causing the management server to calculate an optimized file size of the virtual hard disk file based on a difference between the used volume and the file size, wherein the virtual hard disk file is included in a second file system managed by a management Operating System on the physical server, a calculating unit calculating the optimized file size based on a difference between the total file size adding up the file size of the virtual hard disk file and the file size of any other virtual hard disk file, and the total used volume adding up the used volume of the first file system corresponding to the virtual hard disk file and the used volume of a file system corresponding to the other virtual hard disk file.

* * * * *